(12) United States Patent
Schramm

(10) Patent No.: US 7,187,646 B2
(45) Date of Patent: Mar. 6, 2007

(54) LINK QUALITY DETERMINATION OF A TRANSMISSION LINK IN AN OFDM TRANSMISSION SYSTEM

(75) Inventor: Peter Schramm, Erlangen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1093 days.

(21) Appl. No.: 09/910,732

(22) Filed: Jul. 24, 2001

(65) Prior Publication Data

US 2002/0110138 A1    Aug. 15, 2002

(30) Foreign Application Priority Data

Jul. 25, 2000    (EP) ................... 00115037

(51) Int. Cl.
  *H04J 11/00*    (2006.01)
(52) U.S. Cl. ............ 370/206; 370/210; 370/480; 375/260
(58) Field of Classification Search ........ 370/203–207, 370/208, 210, 465, 480, 332, 430, 441, 335, 370/342; 455/67.13, 67.11; 375/260, 146–148, 375/222, 377, 140, 141
See application file for complete search history.

(56) References Cited

U.S. PATENT DOCUMENTS

| 5,323,331 | A | | 6/1994 | Schenk et al. | |
|---|---|---|---|---|---|
| 5,867,478 | A | * | 2/1999 | Baum et al. | 370/203 |
| 6,108,374 | A | * | 8/2000 | Balachandran et al. | 375/227 |
| 6,456,653 | B1 | * | 9/2002 | Sayeed | 375/227 |
| 6,690,680 | B1 | * | 2/2004 | Marchok et al. | 370/480 |
| 6,747,945 | B2 | * | 6/2004 | Sudo et al. | 370/203 |

FOREIGN PATENT DOCUMENTS

| EP | 0899906 A2 | 3/1999 |
|---|---|---|
| EP | 0952711 A2 | 10/1999 |

* cited by examiner

*Primary Examiner*—Hassan Kizou
*Assistant Examiner*—Habte Mered
(74) *Attorney, Agent, or Firm*—Roger S. Burleigh

(57) ABSTRACT

The present invention relates to a link quality determination unit (LQ-DET) for determining a link quality (LQ) of a transmission link (TL) between an OFDM transmitter (TR) and an OFDM receiver (RC) of an OFDM transmission system (SYS). A first link quality measure determination unit (Q1-DET) determines a first link quality measure ($Q_1$) on the basis of a signal power variation or a signal-to-noise variation determined by a variation determination unit (VS-DET). A second link quality determination unit (Q2-DET) calculates a second link quality measure ($Q_2$) on the basis of an average signal-to-noise ratio based on the noise power ($P_z$) and the signal power ($P_s$). To perform a link adaptation (LA) an overall link quality determination unit (Q-DET) combines the first and second link quality measures ($Q_1$, $Q_2$) into an overall link quality measure (Q).

45 Claims, 16 Drawing Sheets

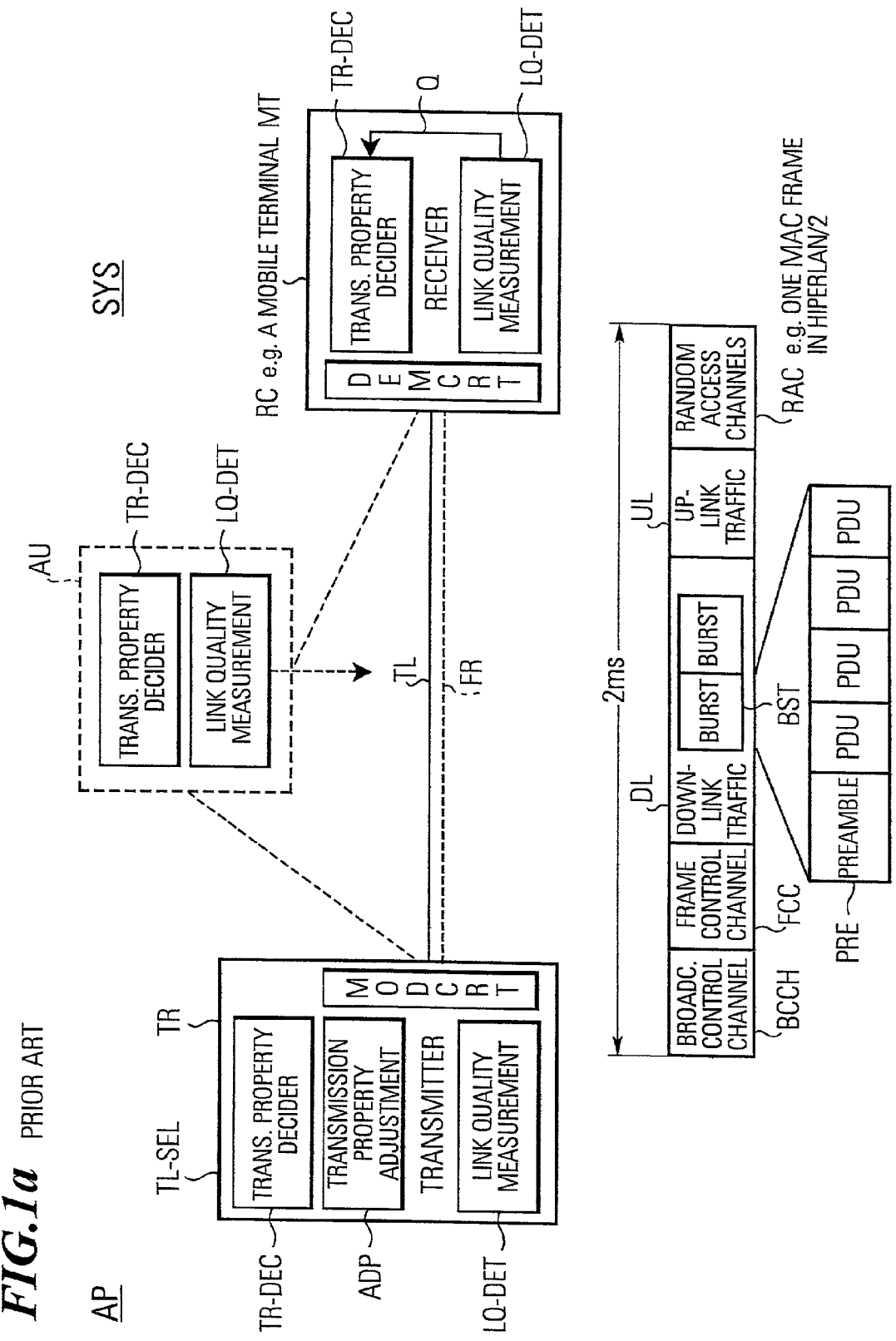

FIG.2a
PRIOR ART

| MODE | MODULATION | CODE RATE | PHYSICAL LAYER BIT RATE |
|---|---|---|---|
| 1 | BPSK | 1/2 | 6 Mbps |
| 2 | BPSK | 3/4 | 9 Mbps |
| 3 | QPSK | 1/2 | 12 Mbps |
| 4 | QPSK | 3/4 | 18 Mbps |
| 5 | 16 QAM | 9/16 | 27 Mbps |
| 6 | 16 QAM | 3/4 | 36 Mbps |
| 7 | 64 QAM | 3/4 | 54 Mbps |

FIG.2b
PRIOR ART

| PARAMETER | SYMBOL | VALUE IN HIPERLAN/2 |
|---|---|---|
| CARRIER FREQUENCY | | 5.2-5.8 GHz |
| CHANNEL FREQUENCY SPACING | | 20 MHz |
| SAMPLING RATE AFTER 64-POINT IFFT | $1/T$ | 20 MHz (= 1/(50ns)) |
| FFT LENGTH | | 64 |
| NUMBER OF USED SUBCARRIERS | $N_{ST}$ | 52 |
| NUMBER OF DATA SUBCARRIERS | $N_{SD}$ | 48 |
| NUMBER OF PILOT SUBCARRIERS | $N_{SP}$ | 4 |
| LENGTH OF CYCLIC PREFIX | | 16 SAMPLES, EQ. TO 0.8μs |
| OFDM SYMBOL PERIOD INCL. CYCLIC PREFIX | | 4μs |

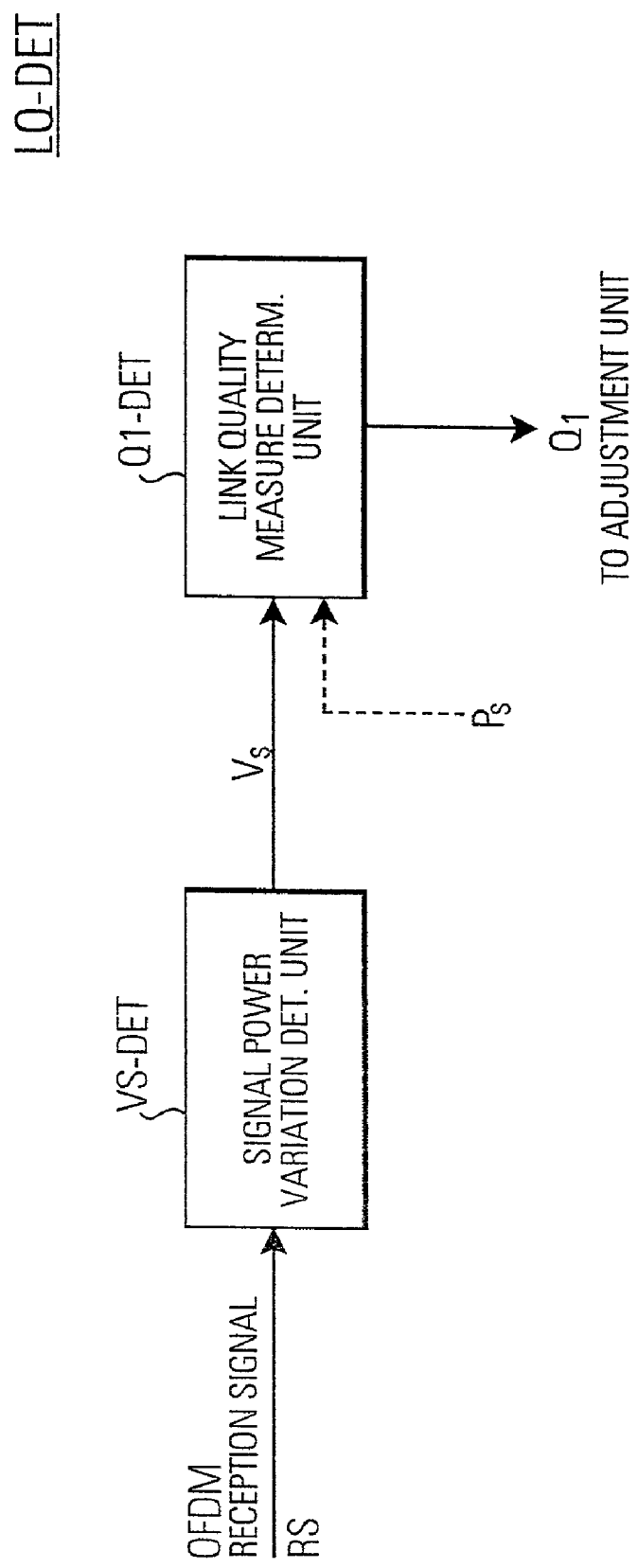

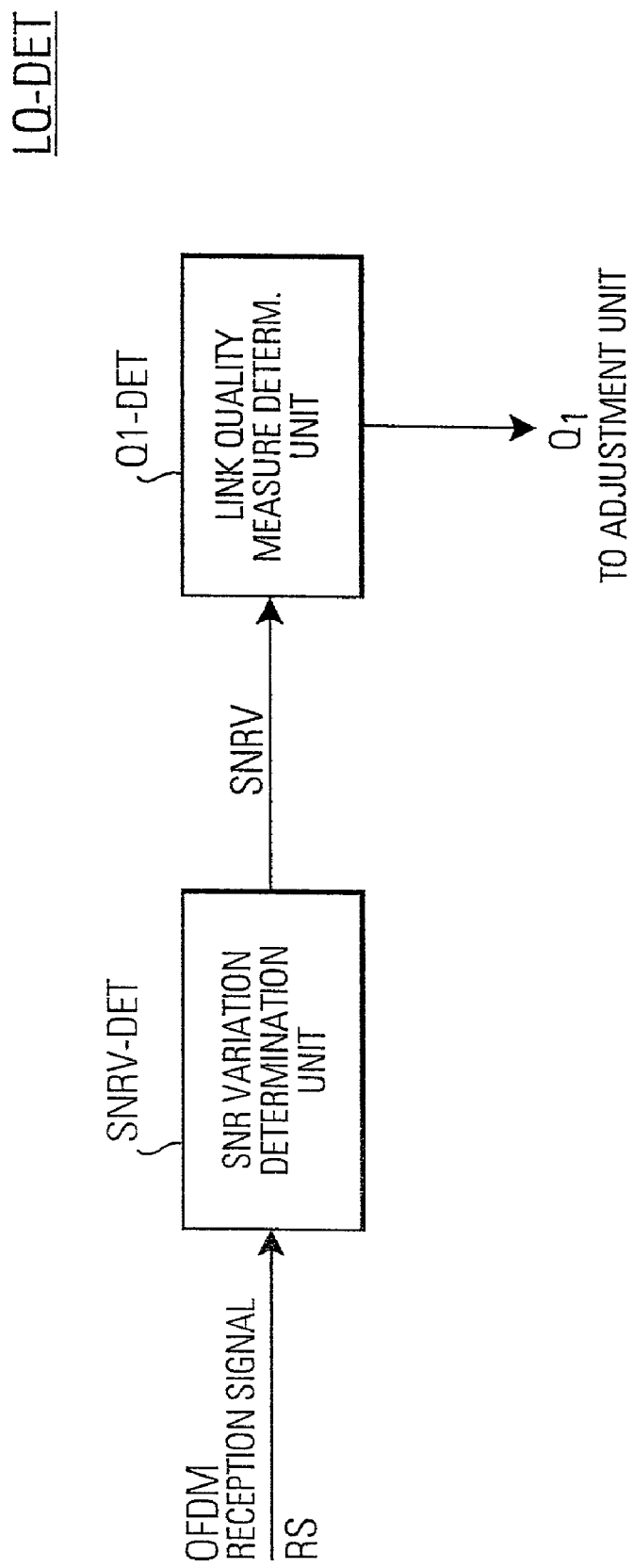
FIG. 5a PRINCIPLE OF THE INVENTION

FIG.5b

LQ-DET

FROM CHANNEL ESTIMATER:CH-EST → NOISE SAMPLE ESTIMATION (ZM-DET)

$\hat{H}_m$ : CHANNEL ESTIMATE $\hat{Z}_m[k]$ → SIGNAL-TO-NOISE VARIATION DET. UNIT (SNRV-DET)

SNRV → LINK QUALITY MEASURE DETERM. UNIT (Q1-DET) → $Q_1$ TO ADJUSTMENT UNIT

LINK QUALITY DETERMINATION OF A TRANSMISSION LINK IN AN OFDM TRANSMISSION SYSTEM

FIELD OF THE INVENTION

The present invention relates to a link quality determination unit and a link quality determination method for determining a link quality of a transmission link between an OFDM transmitter and an OFDM receiver of an OFDM transmission system. The present invention also relates to a transmission link property selector including such a link quality determination unit.

In any transmission system and in particular in an OFDM system a transmission link quality measure is to be determined in order to allow the selecting and adjusting of transmission properties or transmission characteristics of the transmissions on the transmission link. In order to obtain the transmission link quality measure the OFDM transmission signal can be evaluated to obtain parameters based on which a suitable link quality measure is determined. The present invention in particular addresses the problem how such a link quality measure can be obtained with high accuracy in an OFDM (Orthogonal Frequency Division Multiplexing) system. The present invention also relates to processing devices which can provide the necessary parameters from which the quality measure can be constructed.

BACKGROUND OF THE INVENTION

Orthogonal Frequency Division Multiplexing (OFDM) is a modulation scheme which is typically used in transmission systems exhibiting a time dispersion which is much greater than the bit period. OFDM is already specified in Digital Audio Broadcasting (DAB) and Digital Video Broadcasting (DVB). Currently, OFDM is also contemplated for use in Wireless Local Area Networks (WLAN) in the 5 GHz band as specified in Europe, USA and Japan. The European standard is the so-called HIgh PErformance Radio Local Area Network type 2 (HIPERLAN/2). This standard is currently being developed by the ETSI (European Telecommunication Standard Institute) Project BRAN (Broadband Radio Access Network). Furthermore, it may be noted that the North American and the Japanese standards for the OFDM systems have very similar physical layers as the aforementioned HIPERLAN/2 standard.

An overview of a typical OFDM transmission system SYS showing the blocks relevant for the invention is shown in FIG. 1a. Typically, an OFDM transmission TR and an OFDM receiver RC, e.g. a mobile terminal (MT), communicate over a transmission link TL. The transmitter TR comprises conventional modulation circuitry MODCRT for modulating some source information into a plurality of OFDM symbols on a plurality of subcarriers. As is known to the skilled person, this is performed by using essentially a coder and an inverse discrete Fourier transform process.

The receiver RC comprises some conventional demodulation circuitry DEMCRT for demodulating the OFDM symbols on the plurality of subcarriers back into the source information.

As known to the skilled person such demodulated circuitry DEMCRT comprises as main components a decoder and a discrete Fourier transform.

The transmission system SYS may be a fixed network or a mobile radio communication network where for example access points AP are used in order to provide an access to a receiver RC, e.g. a mobile terminal MT. However, in principle the system architecture also applies to other types of transmission systems in addition to a mobile radio communication network.

Whilst it is common to all OFDM systems that the OFDM modulation takes place at a transmitter TR and an OFDM demodulation takes place at the receiver RC, the specific manner in which the transmission takes place over the transmission link depends on the used protocol for the data exchange. FIG. 1a shows an example of the data transmission in accordance with the HIPERLAN/2 standard according to which a transmission in terms of MAC (Multiple Access Control) frames FR having a duration of e.g. 2 ms takes place. In accordance with the HIPERLAN/2 standard, each transmission frame FR consists of Broadcast Control Channel BCCH information followed by Frame Control Channel FCC information after which the respective downlink traffic and uplink traffic and information of Random Access Channels RAC follows. The actual OFDM symbols are contained in individual bursts BST. Each burst BST contains a preamble part PRE and some protocol data units PDU. The preamble part PRE is necessary in each burst in order to allow error correction and receiver training.

Typically, as shown in FIG. 1b, each preamble part PRE comprises two training symbols TS and a cyclic prefix CP. There are several different preambles for the different burst types for downlink, uplink and random access. However, every preamble includes the same part of the cyclic prefix CP and training symbols TS to allow a channel estimation. At a 20 MHz sampling frequency and a duration of 1.6 μs for the cyclic prefix CP and a duration of 3.2 μs for the training symbol TS, each preamble PRE contains 32 samples for the cyclic prefix CP and 64 samples for each training symbol.

Of course, the transmission via the transmission link TL (wireless or over wire) suffers from noise, distortion or other interferences such that the receiver RC can make wrong decisions regarding the assumed sent OFDM information. One of the reasons to include the known training symbols (i.e. also known on the receiver side) into the respective preamble part is to allow a receiver training, i.e. to compare the received training symbols with the known training symbols for example to estimate the channel coefficients in the receiver RC in order to avoid wrong decisions as much as possible.

Since the extent of interference, noise or distortion is dynamic, i.e. it may depend on the number of interfering users, the received signal power, the transmission conditions, etc., the transmitter TR is typically equipped with a transmission link property adjustment unit ADP which can dynamically adapt or adjust the transmission characteristics of the communication on a transmission link TL. Thus, the adjustment unit ADP performs a function which is usually referred to as link adaptation (LA), i.e. a setting of predetermined transmission properties which are assumed to increase the transmission link quality. For example, according to the HIPERLAN/2 standard, various physical layer modes can be set by the adjustment unit ADP. FIG. 2a shows the key parameters of the HIPERLAN/2 physical layer modes. FIG. 2b shows a table of the key parameters of the HIPERLAN/2 physical layer. It should be noted that the physical layer mode setting is performed on the basis of the available physical layer modes as shown in FIG. 2a. LA should be understood as a general term for methods to select transmitter parameters. This, for instance, includes the setting of output power, which is also referred to as power control. For example, in a conventional transmitter the transmission power may be controlled on the basis of the received power at the receiver and/or on the basis of the measured SNR.

As shown in FIG. 2a, HIPERLAN/2 provides six mandatory modes with bit rates of 6, 9, 12, 18, 27, 36 Mbps and one further optional mode with a bit rate of 54 Mbps. By switching between the different physical layer modes, the transmission quality on the transmission link TL can be dynamically adapted to the prevailing transmission conditions.

However, the adjustment unit ADP needs an indication from a transmission link property selector TL-SEL in order to know which physical layer mode needs to be selected. Typically, the transmission link property selector TL-SEL is formed by a link quality measurement unit LQ-DET which performs link quality measurements (LQMs) on the transmission link TL and which outputs a link quality measure Q to a transmission property decider TR-DEC. On the basis of the link quality measurements carried out by the link quality measurement unit LQ-DET, the transmission property decider TR-DEC decides the physical layer mode and provides an indication with respect to the selected physical layer mode to the adjustment unit ADP which then sets the selected physical layer mode.

Link quality measurements can in principle be carried out by a link quality measurement unit LQ-DET on the transmitter TR or elsewhere in the access point AP site (the transmitter is part of the access point AP), on the receiver RC site or even within another unit AU of the transmission system SYS involved in the communication and being arranged elsewhere, i.e. neither in the access point AP or the transmitter TR or the receiver RC. Likewise, the transmission property decider TR-DEC may be provided in the transmitter TR or elsewhere in the access point AP, in the receiver RC or in any other unit AU. If the transmission property decider and the link quality measurement unit are provided outside the transmitter TR, the adjustment unit ADP will eventually receive a corresponding signal from the outside provided transmission property decider TR-DEC. Therefore, the transmission link property selector TL-SEL constituted by the transmission property decider TR-DEC and the link quality measurement unit LQ-DET should not be seen as situated exclusively in the transmitter TR or receiver RC since the particular arrangement will depend on the system implementation. A common aspect is that LQMs must be carried out and a corresponding selection signal with respect to the selected physical layer mode must be provided to the adjustment unit ADP. Link adaptation (LA) schemes may use a variety of link quality measurements which may be derived either on the data link control (DLC) layer or the physical layer.

Of course, it is very important how the link quality measurements are carried out and how the link quality measure is determined since the link quality measure is the very criterion which will be used as decision criterion for selecting the appropriate transmission mode. For example, if the link quality measure is not accurate, an over compensation, i.e. a lower bit rate than would actually be possible, may be selected. Likewise, if the link quality measure is incorrect, i.e. predicts a better transmission quality than it is actually present, then a too high bit rate may be selected than would actually be appropriate. Therefore, the determination of the link quality measure, i.e. how the link quality measurements are carried out and what parameters are used for deriving the link quality measure, is of essential importance for an accurate link adaptation.

DESCRIPTION OF THE PRIOR ART

A link quality measure available on the data link layer (DLC) is based on PDU (Protocol Data Unit) Error Rate (PER) estimates (or Frame Error Rate Estimates) derived from CRC (Cyclic Redundancy Check).

Other well-known link quality measures are based on estimates of the Received Signal Strength (RSS), estimates of the Signal-to-Noise power Ratio (SNR) or estimates of the raw bit error rate. The latter can be based on a decoding and re-encoding of data which may be calculated on the physical layer.

On the basis of the estimates, i.e. the link quality measurements, a quality measure or a quality criterion is derived which is then used for the link adaptation as explained above. If for example in HIPERLAN/2 a packet data transmission without a delay constraint is assumed, a suitable quality measure is the maximum link throughput of data in terms of Mbps. The link throughput of an ideal selective-repeat ARQ (Automatic Repeat request) scheme can be simply approximated by (bit rate)*(1-PER). Obviously, the PER would be the measure of interest. However, a reliable direct measurement of PER takes too much time and therefore an indirect estimation of the PER, for example via a SNR estimate, is a straightforward measurement.

However, in many systems which suffer from fading, PER as a function of the SNR depends on further channel parameters. For instance, the error rate as a function of SNR or carrier-to-interference power ratio may be significantly different for different channel characteristics like delay spread. Therefore, further measurements need to be taken into account.

In principle, link quality measurements LQM have already been considered for other systems like GPRS (General Packet Radio System) and EDGE (Enhanced Data Rates for Global Evolution). The link quality measures in such systems are essentially based on bit error rate measurements, signal-to-noise estimates or estimates of the received signal strength. However, such link quality measures can not easily be used in OFDM systems like HIPERLAN/2.

In particular, in an OFDM system channel parameters like the delay spread affect the link quality and hence, the desired link adaptation behaviour and the switching criteria. Such effects are not taken into account by the conventional link quality measures.

SUMMARY OF THE INVENTION

As explained above, whilst systems such as GPRS and EDGE and other conventional communication systems use link quality measures such as the SNR, PER and RSS, such link quality measures do not take into account the characteristics of the instantaneous channel realization. In particular, they do not take into account the characteristics like the delay spread, and consequently the use of such link quality measures in an OFDM system does not lead to an accurate link adaptation.

Therefore, the object of the present invention is to provide a link quality determination unit, a link quality determination method and a transmission link property selector including such a link quality determination unit which allow to provide an accurate link quality measure of a transmission link in a OFDM transmission system.

The present invention also aims at providing processing devices which can provide suitable parameters necessary for deriving the improved link quality measure.

This object is solved by a link quality determination unit for determining a link quality of a transmission link between an OFDM transmitter and an OFDM receiver of an OFDM transmission system, wherein said link quality determination unit comprises a signal power variation determining unit adapted to determine the signal power variation of the reception signal in the receiver and at least a first link quality measure determination unit adapted to determine a first link quality measure representing the variation of the subcarrier signal power on the basis of the signal power variation as determined by the signal power variation determining unit.

This object is also solved by a link quality determination unit for determining a link quality of a transmission link between an OFDM transmitter and an OFDM receiver of an OFDM transmission system wherein said link quality determination unit comprises a signal-to-noise variation determining unit adapted to determine the signal-to-noise variation of the reception signal in the receiver and at least a first link quality measure determination unit adapted to determine a first link quality measure representing the variation of the signal-to-noise variation on the basis of the signal-to-noise variation as determined by the signal-to-noise variation determining unit.

This object is also solved by a transmission link property selector including a transmission link property decider for selecting transmission properties of an OFDM transmission link depending on a transmission link quality measure, wherein said transmission link property selector comprises a link quality determining unit as defined above for outputting said link quality measure, and said transmission link property decider is adapted to decide on the transmission properties of said transmission link on the basis of the link quality measure output by the link quality determination unit.

This object is also solved by a link quality determination method for determining a link quality of a transmission link between an OFDM transmitter and an OFDM receiver of an OFDM transmission system including the steps of determining the signal power variation and determining a first link quality measure on the basis of the determined signal power variation.

This object is also solved by a link quality determination method for determining a link quality of a transmission link between an OFDM transmitter and an OFDM receiver of an OFDM transmission system including the steps of determining the signal-to-noise variation and determining a first link quality measure on the basis of the determined signal-to-noise variation.

The object is also solved by a processing device of an OFDM system, comprising a noise power determination unit adapted to determine the noise power of a received signal in an OFDM system, including a noise sample estimate determining unit which is adapted to determine a noise sample estimate for each sub carrier in each OFDM symbol and a noise sample averaging unit which is adapted to determine the noise power by averaging the noise sample estimate power over a plurality of subcarriers, wherein said noise power determining unit is further adapted to determine the noise power by averaging said noise sample estimate power also over a plurality of OFDM symbols, and wherein said noise sample estimate determining unit is adapted to determine said noise sample estimates for each subcarrier in each OFDM symbol on the basis of the respective received signal sample on the respective subcarrier in the respective OFDM symbol, of subcarrier symbol information about the subcarrier symbol transmitted on the respective subcarrier in the respective OFDM symbol, and of the channel coefficient estimate on the respective subcarrier. The parameters provided by such a processing device can be used for deriving a more accurate link quality measure in an OFDM system.

As mentioned above, in accordance with the invention variations of some critical values for the transmission, like the signal power and the signal-to-noise ratio, are determined, to include effects due to the frequency-selective channel, i.e. to include the effects of the instantaneous channel frequency response which significantly affects the instantaneous error rate, in the derivation of a suitable link quality measure. Thus, for example the delay spread as one of the channel parameters can be included in the link quality measure and thus in the link adaptation behaviour and in the switching criteria.

Preferably, the link quality determination unit comprises a channel coefficient estimator which is adapted to determine estimates of the channel coefficients for the respective subcarriers. The determined variance of the signal power allows in an easy manner to estimate an accurate signal power variation.

Preferably, the first link quality measure determination unit is adapted to determine the first link quality measure by determining a ratio of the signal power variation to the squared signal power. This allows in an advantageous manner to normalize the link quality measure in order to eliminate constant factors in the receiver chain.

Preferably, a noise sample estimate determination unit can be provided in order to determine a noise sample estimate for each subcarrier in each OFDM symbol, wherein said signal-to-noise variation determining unit is adapted to determine as the signal-to-noise variation the signal-to-noise variance by determining a SNR mean value by respectively summing the power of the channel estimation coefficients and the power of the noise samples over the plurality of subcarriers and by forming the ratio thereof and by determining the ratio of the power of the respective channel coefficient estimate for the respective subcarrier to the power of the respective noise sample estimate for the respective subcarrier, by subtracting from this ratio the SNR mean value, determining the absolute value of the subtraction result, squaring the absolute value and averaging the determined absolute values over a plurality of subcarriers.

Thus, also the variance of the signal-to-noise ratio may be used as an accurate reflection of the variation of the signal-to-noise power.

Preferably, the link quality determination unit comprises said signal-to-noise variation determining unit is adapted to determine as the signal-to-noise variation the signal-to-noise variance by determining the ratio of the power of the respective channel coefficient estimate for the respective subcarriers to the power of the respective noise sample estimate for the respective subcarrier, and by averaging the determined ratios over a plurality of subcarriers.

Since two different more accurate link quality measures, i.e. the first and second link quality measures, can be provided, an overall link quality measure determining unit can advantageously determine an overall link quality measure by combining the first and second link quality measures. Thus, the link adaptation can advantageously be based on the first link quality measure, the second link quality measure or a combination of both link quality measures, i.e. an overall link quality measure.

Preferably, the link quality determination unit comprises a channel coefficient estimater which is adapted to determine estimates of the channel coefficients for the respective subcarriers; a signal power determining unit which is adapted to determine the signal power by averaging the power of the estimated channel coefficients over a plurality of subcarriers; said noise power determination unit including a noise sample estimate determining unit which is adapted to determine a noise sample estimate for each subcarrier in each OFDM symbol; and a noise sample averaging unit which is adapted to determine the noise power by averaging the noise sample estimate power over a plurality of subcarriers; wherein said second link quality measure determination unit is adapted to determine said second link quality measure by determining the ratio of the determined signal power to said determined noise power.

Preferably, said noise sample averaging unit is further adapted to determine the noise power by averaging said noise sample estimate power also over a plurality of OFDM symbols. This allows to provide an even more accurate second link quality measure representing the average subcarrier signal-to-noise power ratio.

Preferably, said noise sample estimate determining unit is adapted to determine said noise sample estimates for each subcarrier in each OFDM symbol on the basis of the respective received signal sample on the respective subcarrier in the respective OFDM symbol, of subcarrier symbol information about the subcarrier symbol transmitted on the respective subcarrier in the respective OFDM symbol, and of the channel coefficient estimate on the respective subcarrier. This determination of noise sample estimates is particularly advantageous, because it is based on a suitable model of an equivalent communication channel in an OFDM system.

Preferably, said noise sample estimate determining unit comprises a multiplier for multiplying the channel coefficient estimate on the respective subcarrier with the subcarrier symbol information and a subtractor for subtracting the multiplication result from the respective received signal sample, the output of the subtractor constituting said noise sample estimates for each subcarrier in each OFDM symbol.

Preferably, the subcarrier symbol information used for the determination of the noise sample estimates is the subcarrier symbol information of one or more OFDM training symbols contained in the preamble part of a burst. Thus, the known training symbols can be used for determining noise sample estimates.

Preferably the subcarrier symbol information can be a subcarrier symbol estimate information of data-bearing subcarrier symbols within the protocol data units within a burst.

Preferably, the subcarrier symbol estimate information of data-bearing subcarrier symbols within the protocol data units within a burst is generated by a remodulation unit which is adapted for re-modulation of OFDM symbol decisions output by the demodulator.

Preferably, the subcarrier symbol estimate information of data-bearing subcarrier symbols within the protocol data units within a burst is generated by a reencoding/remodulation unit which is adapted for re-encoding/re-modulating of the output by the decoder.

Preferably, said second link quality measure determination unit determines the second link quality measure at several instances during a frame or during bursts and calculates a modified first link measure as a cumulative density function. This allows to account for interference power which may be quickly fluctuating from frame to frame or even within the frames, i.e. in transmission conditions with a dominating interference.

Preferably, the noise sample estimate determining units and the manner how to determine the subcarrier symbol information for the noise power calculation can be used in the aforementioned processing device.

Further advantageous embodiments and improvements of the invention may be taken from the attached claims. Furthermore, it should be noted that the invention is not restricted to the special embodiments and examples of the present disclosure and that the present description only reflects of what is regarded as the best mode of the invention by the inventors.

Therefore, further modifications and verifications of the invention may be carried out on the basis of the teachings contained herein. In particular, the invention may comprise embodiments consisting of features and/or steps which have been described and claimed separately in the description and the claims.

BRIEF DESCRIPTION OF THE DRAWINGS

Further objects, advantages and features of the invention will be apparent from the description here below when viewed together with the attached drawings.

FIG. 1a shows an OFDM transmission system SYS in accordance with the prior art.

FIG. 1b shows the preamble part PER of a burst BST shown in FIG. 1a.

FIG. 2a shows the key parameters of the physical layer modes of an exemplification HIPERLAN/2 OFDM system.

FIG. 2b shows the key parameters of the HIPERLAN/2 physical layer.

FIG. 4a shows a block diagram in accordance with a first aspect of the principle of the invention for determining a link quality measure on the basis of signal power variations.

FIG. 5a shows a block diagram similar to FIG. 4a for the determination of a link quality measure depending on a SNR variation.

FIG. 5b shows a block diagram similar like FIG. 4a for the determination of parameters used for the signal-to-noise variation determination in FIG. 5a.

Hereinafter, the principle of the invention and embodiments thereof will be described with reference to the attached drawings. Furthermore, it should be noted that the invention is not restricted to a specific value mentioned below, e.g. the number of subcarriers or the number of pilot subcarriers. Furthermore, although reference is made below to the HIPERLAN/2 system, the invention is not restricted to the use in a HIPERLAN/2 system and may be used in any other OFDM communication system, wireless or wire-based, the common feature being that an OFDM modulation and OFDM demodulation is carried out in a transmitter and receiver, respectively, and that preferably link adaptation is possible on the basis of link quality criteria.

Figure 1B:
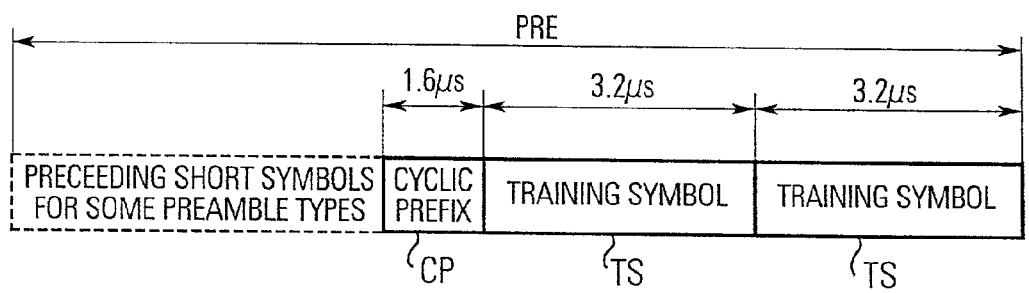

Furthermore, it should be noted that the present invention is generally applicable to an OFDM communication system SYS shown in FIG. 1, i.e. including a transmitter TR and a receiver RC which respectively include the link quality measurement determination unit LQ-DET and the transmission property decider TR-DEC.

PRINCIPLE OF THE INVENTION

To obtain the more accurate link quality measures in accordance with the invention, it is first necessary to select an appropriate model of the possible attenuation and distortion which may take place on a frequency-selective channel of the transmission link in an OFDM communication system.

Figure 3:
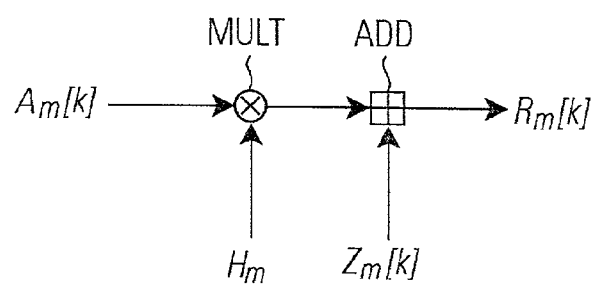
FIG. 3 shows a model of an equivalent communication channel on subcarrier m in OFDM symbol k.

OFDM can be viewed as a set of equivalent communication channels on the various subcarriers. The equivalent channels are independent if there is no inter-subcarrier interference. A model for an equivalent communication channel on one subcarrier is shown in FIG. 3. The following parameters are defined in FIG. 3:

| | |
|---|---|
| $A_m[k]$ | Subcarrier symbol transmitted on subcarrier m $\in \aleph_{ST}$ in OFDM symbol k; |
| $H_m$ | Channel coefficient on subcarrier m, assumed constant within burst; |
| $Z_m[k]$ | Noise or interference sample on subcarrier m in OFDM symbol k; |
| $R_m[k]$ | Received signal sample on subcarrier m in OFDM symbol k; |
| $M \in \aleph_{ST}$ | Subcarrier index; |
| $\aleph_{ST}$ | Set of indexes of used subcarriers; |
| $k \in \{0, 1, 2, \ldots\}$ | OFDM symbol index within a burst. |

Of course, on the receiver side or the access point site where the link quality measurements and the determination of the link quality criterion is performed, the actual subcarrier symbol transmitted on the subcarrier m in OFDM symbol k by the transmitter TR as well as the channel coefficient on the subcarrier n will not be known. However, estimates of the transmitted subcarrier symbols and estimates of the channel coefficients can be derived. These estimates are denoted as follows:

| | |
|---|---|
| $\hat{A}_m[k]$ | Estimate of subcarrier symbol transmitted on subcarrier m in OFDM symbol k; |
| $\hat{H}_m$ | Estimate of channel coefficient on subcarrier m. |

As shown in FIG. 3, regarding the effects of the channel and the noise, the equivalent communication model on subcarriers essentially assumes, for each subcarrier m, that the channel coefficient $H_m$ will be multiplied by a multiplier MULT with the transmitted subcarrier symbol $A_m[k]$ and that there is an additive noise or interference sample $Z_m[k]$ added by the adder ADD. The result of the multiplication and addition is the received signal sample on the subcarrier m in the OFDM symbol k.

The underlying idea of the present invention is that during transmission and reception the OFDM signal is attenuated and distorted by a frequency-selective channel and that the noise and/or interference with an unknown level is added via an addition ADD on each subcarrier. As shown in FIG. 3, according to the principle of the invention these two effects can be separated. Since the instantaneous channel frequency response significantly affects the instantaneous error rate, in accordance with the invention the signal power variations over a plurality of subcarriers need to be taken into account.

First Embodiment (Signal Power Variation)

As shown in FIG. 4a, a link quality determination unit LQ-DET in accordance with the invention for determining a link quality LQ of a transmission link TL between an OFDM transmitter TR and an OFDM receiver RC of an OFDM transmission system SYS comprises a signal power variation determining unit VS-DET which is adapted to determine the signal power variation $V_s$ of the OFDM reception signal RS in the receiver RC. Furthermore, there is provided at least a first link quality measure determination unit Q1-DET adapted to determine a first link quality measure Q1 representing the variation of the subcarrier signal power on the basis of the signal power variation $V_s$ as determined by the signal power variation determining unit VS-DET.

The signal power variation characterizes the instantaneous channel impulse response, and, more particular, its impact on the error rate performance. In this respect, it can be viewed as a refinement of the estimate of the error rate that could be obtained by the SNR estimate only. The signal power variation is a suitable measure because it is strictly connected to the "instantaneous" delay spread of the instantaneous channel impulse response. Moreover, the signal power variation determined over the subcarriers is a better measure than a characterization of the time-domain impulse response, because coding is effectively performed on the subcarrier symbols in the frequency domain.

Looking at the equivalent communication model on subcarriers in FIG. 3, it may be understood that at a certain instance in time the total signal power is formed by contributions of the power of each individual subcarrier. The determination of a signal power variation in accordance with the invention means firstly the determination of a deviation of each subcarrier's power contribution with respect to a predetermined power comparison level and the combining of all the subcarrier power deviations into a common signal power variation value. However, also a time-dependent signal power variation determination is considered by the invention.

For example, it is also possible to average or integrate the subcarrier power deviations individually over time (over several instances in time) and to only then combine the integrated subcarrier power deviations into the overall signal power variation value.

Alternatively, it may be envisaged that the individual subcarrier powers are first integrated (average) a plurality of times and only the thus averaged individual subcarrier powers are compared with the power threshold and only then the thus determined power deviation values are combined into the overall signal power variation value.

Alternatively, it is also possible to simply calculate at several instances in time an overall signal power variation value and integrate (averaged) this overall signal power variation value over several instances in time.

Thus, not only the instantaneous subcarrier power deviation at a single instance in time may be considered, but it is also possible to include a time integration to form an appropriate signal power variation value.

Figure 12:
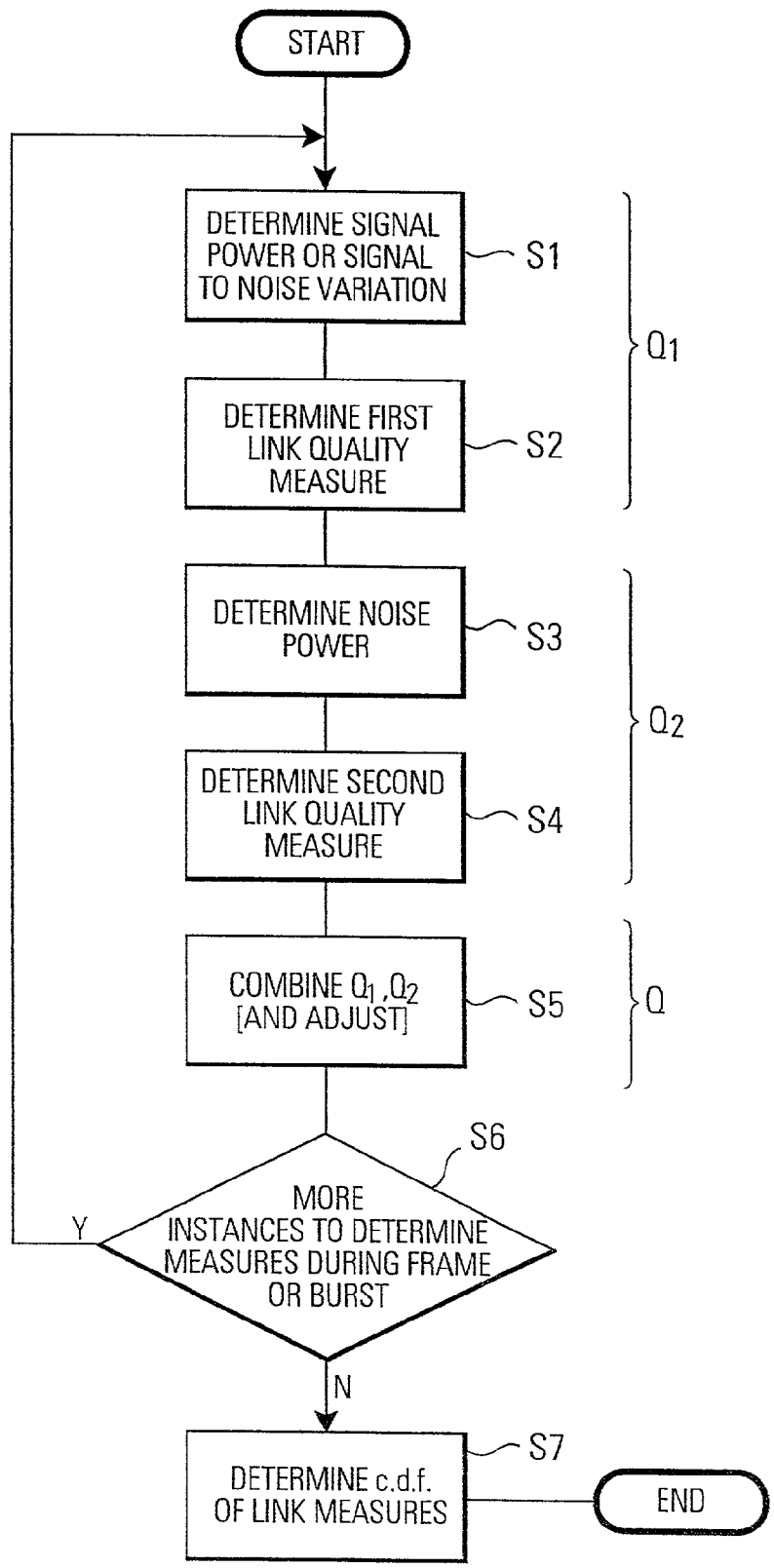
FIG. 12 shows a principle flow diagram of the steps carried out for determining the first and second link quality measures.
Figure 13A:
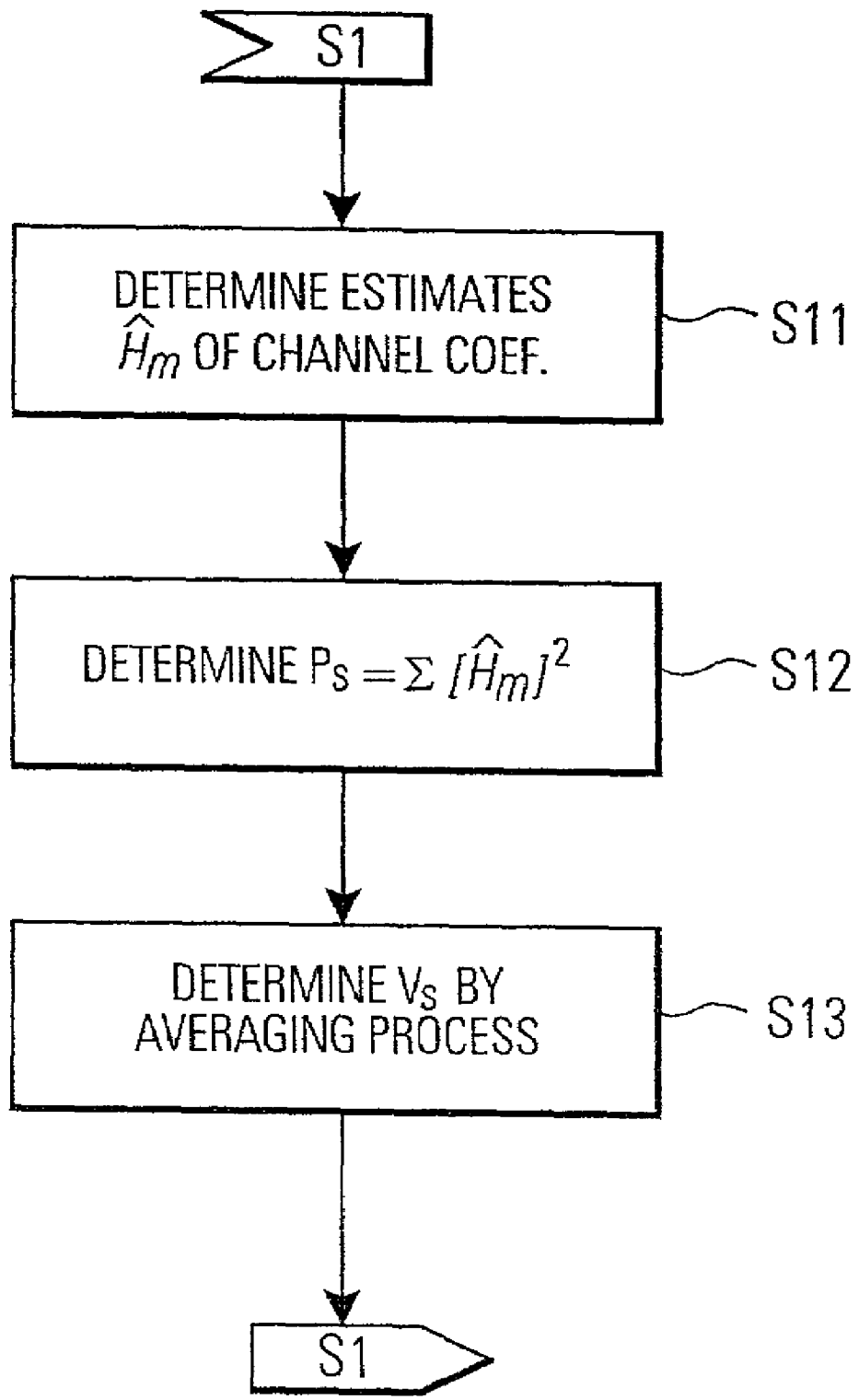
FIG. 13a shows a flowchart for calculating a signal power variance in accordance with the first embodiment of the invention.

Hereinafter, with reference to FIG. 4b, one example of a signal power variation determination in terms of the signal power variance will be described. FIG. 13a shows a flow diagram of step S1 shown in FIG. 12. FIG. 12 shows an overall flowchart of the invention for determining at least two different link quality measurement criteria.

As explained above, in order to determine the signal power variation, a power comparison value must be determined with respect to which the deviation of the respective subcarrier power is evaluated. For calculating the signal power variance $V_s$, preferably the average signal power can be estimated as the power comparison level. The average signal power $P_s$ can simply be estimated by $$P_S = \frac{1}{N_{ST}} \sum_{m \in \mathbb{N}_{ST}} |\hat{H}_m|^2 \quad (1)$$

In a coherent OFDM receiver a channel coefficient estimator HM-EST (see also FIG. 8) is conventionally used and is adapted to determine estimates $\hat{H}_m$ of the channel coefficients for the respective m subcarriers. Therefore, in step S11 an estimation of the channel coefficients $\hat{H}_m$ is calculated. That is, the channel coefficient estimates are available from a channel estimation which is applied conventionally for the coherent demodulation.

In step S12 the signal power determining unit PS-DET determines the signal power $P_S$ by averaging the power of the estimated channel coefficients $\hat{H}_m$ over a plurality $N_{ST}$ of the subcarriers. It is worth noting that all averaging processes mentioned here may be calculated from e.g. 52 used subcarriers. Alternatively, they may be calculated based on 48 data carriers without loosing significant accuracy. This may for example be suitable if the pilot subcarriers are not evaluated for any other purpose and only the data-bearing subcarriers are evaluated.

In step S13 the variance $V_s$ of the signal power may be calculated in accordance with the following equation:

$$V_S = \frac{1}{N_{ST}} \sum_{m \in \mathbb{N}_{ST}} \left||\hat{H}_m|^2 - P_S\right|^2 = \frac{1}{N_{ST}} \sum_{m \in \mathbb{N}_{ST}} |\hat{H}_m|^4 - P_S^2 \quad (2)$$

Figure 4B:
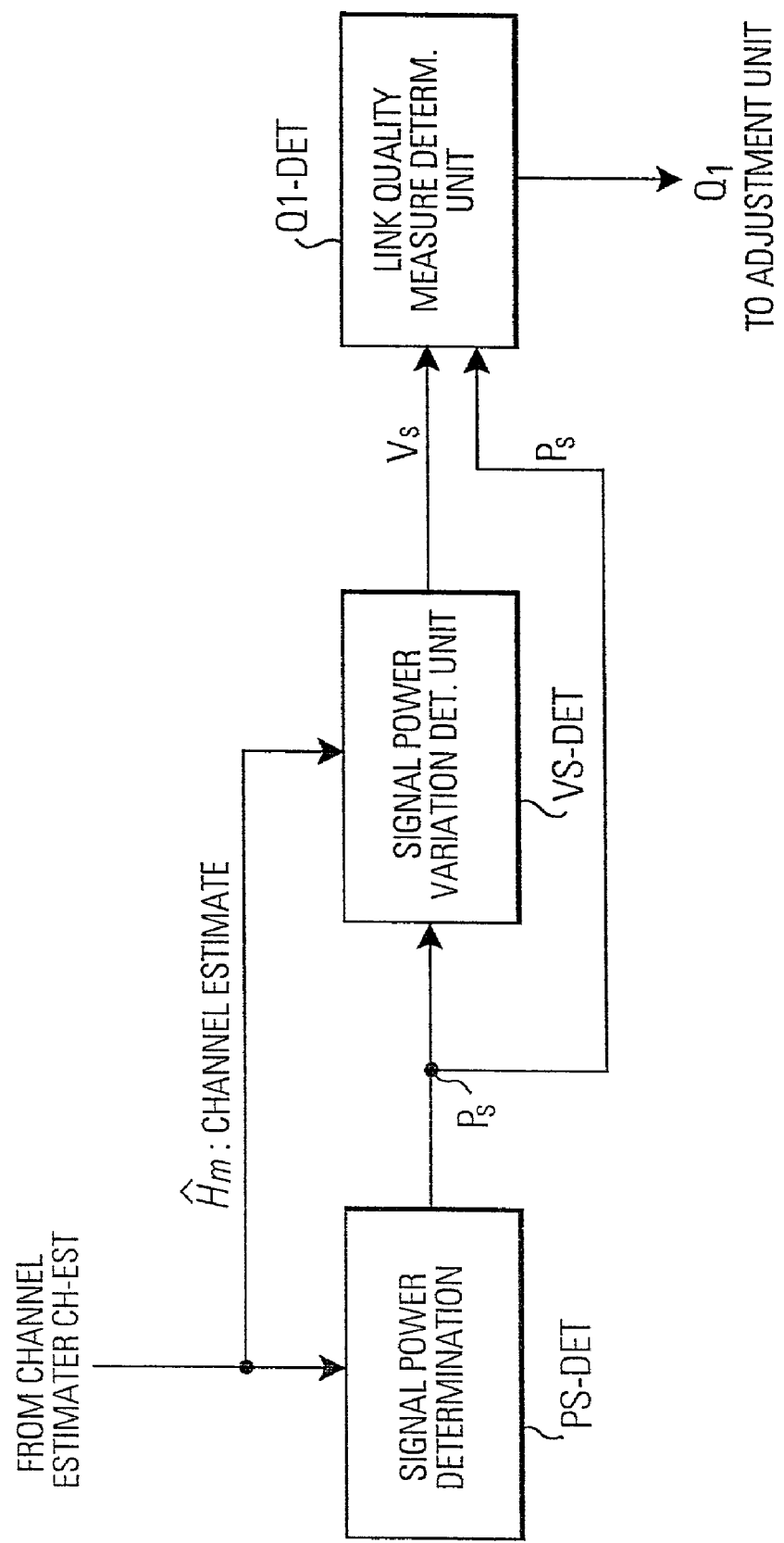
FIG. 4b shows one example of the parameters which can be used for a signal power variation determination and a link quality measure determination.

That is, the signal power variation determination unit in FIG. 4b also receives as input the channel estimates $\hat{H}_m$ and the determined signal power $P_s$. Then, the signal power variation determination unit VS-DET determines as the signal power variation $V_s$ the signal power variance by determining the difference between the power of the estimated channel coefficients $\hat{H}_m$ on the respective m subcarrier and the signal power $P_s$, determining the absolute value of the difference, squaring the absolute value of the difference and averaging the squared absolute value over a plurality $N_{ST}$ of the subcarriers.

Alternatively, as shown with the right-hand side of the equation in (2), this calculation is equivalent to determining the fourth power of the channel estimates $\hat{H}_m$, subtracting the squared value of the signal power $P_S^2$ and averaging the result over the $N_{ST}$ subcarriers.

As shown in FIG. 4a and as indicated in step S2 in FIG. 12, the first link quality measure determination unit Q1-DET determines the first link quality measure $Q_1$ on the basis of the determined signal power variation $V_S$. One example is that the first link quality measure determination unit Q1-DET simply outputs the signal power variation as the quality criterion to be used by the selector and the adjustment unit for readjusting the physical layer mode.

Alternatively, as also indicated in FIG. 4a, FIG. 4b, the first link quality measure determination unit Q1-DET is also adapted to determine said first link quality measure $Q_1$ by determining a ratio of the signal power variation $V_s$ to the signal power $P_S$ in accordance with the following equation:

$$Q_1 = \frac{V_S}{P_S^2} = \frac{1}{N_{ST}} \sum_{m \in \mathbb{N}_{ST}} \left|\frac{|\hat{H}_m|^2}{P_S} - 1\right|^2 = \frac{1}{N_{ST}} \sum_{m \in \mathbb{N}_{ST}} \frac{|\hat{H}_m|^4}{P_S^2} - 1 \quad (3)$$

That is, preferably the first link quality measure determination unit Q1-DET normalizes the variance $V_s$ of the signal power in order to eliminate constant factors in the receiver chain. In equation (3) the squared means signal power is used for this purpose.

Whilst equation (3) gives one example how the first link quality measure $Q_1$ can be calculated, it may be noted that other efficient implementations of the first link quality measure can be devised on the basis of the determined signal power variation $V_S$, i.e. slightly different formulas may be used to obtain other first link quality measures $Q_1$. For example, it may be more suitable to use a value of $Q_1=10 \log_{10} (Q_1/N_{ST})$ instead of $Q_1$ to reduce the number of divisions. Therefore, the aforementioned equation (3) is only one example how the first link quality measure determination unit Q1-DET may be used in order to determine a first link quality measure $Q_1$ on the basis of the determined signal power variation or signal power variance $V_S$.

It should be noted that of course the variance $V_s$ of the signal power does not take into account the dependencies between neighbouring signals. That is, in accordance with the communication model in FIG. 3, the individual subcarriers are independent. This is a reasonable assumption because a typical OFDM receiver RC uses a de-interleaver to ideally remove respective correlations before decoding. Thus, the subcarrier power or the estimated channel coefficients may be regarded as independent from each other.

As described above, on the basis of the communication model in FIG. 3, the idea of the invention is to provide a link quality measure by accounting for the delay spread by evaluating the variation of the signal power variations in all subcarriers. However, as shown in FIG. 5a, there are other suitable parameters whose variation can be evaluated in order to account for the frequency selectivity of the instantaneous channel frequency response.

Second Embodiment (SNR Variation)

In FIG. 5a, a link quality determination unit LQ-DET comprises a signal-to-noise variation determination unit SNRV-DET adapted to determine the signal-to-noise variation SNRV of the reception signal RS in the receiver RC. Furthermore, as in FIG. 4a, a link quality measure determination unit Q1-DET is provided to determine a first link quality measure $Q_1$ representing the variation of the signal-to-noise ratio on the basis of the signal-to-noise variation SNRV as determined by the signal-to-noise variation determining unit SNRV-DET.

In equivalence to the signal power variation, the SNR variation characterizes the impact of the channel impulse response as well as the instantaneous interference power spectrum on the error rate.

As was the case with the signal power variation determination, also the signal-to-noise variation determination may be carried out at a fixed instance in time or may be carried out by averaging and integrating over time.

In accordance with the first example, at a fixed instance in time, the signal-to-noise variation determination means firstly performs the calculation of an individual signal-to-noise ratio (SNR) for each individual subcarrier and the combining of the individual SNRs for the plurality $N_{ST}$ of subcarriers into an overall signal-to-noise variation value as some kind of averaging process over the individual subcarrier's SNRs.

Another example, when an integrating in time is used, may comprise the individual determination of subcarrier SNRs at several instances in time and the averaging (integrating) of the individual SNRs over time and the subsequent averaging (integration) of the SNRs over a plurality of $N_{ST}$ of subcarriers.

A third example is that individual combined (averaged over the plurality of subcarriers $N_{ST}$) SNR values, i.e. the overall signal-to-noise ratio values are integrated (averaged) over several instances of time.

An embodiment of the link quality determination unit LQ-DET which determines a first link quality measure $Q_1$ on the basis of a signal-to-noise variation is shown in FIG. 5b. As in FIG. 4b, the channel estimator CH-EST provides estimates $\hat{H}_m$ of the channel coefficients which are fed to a noise sample estimate determination unit ZM-DET and to the signal-to-noise variation determination unit SNRV-DET.

As will be explained with more details below, the noise sample estimate determining unit ZN-DET is adapted to determine a noise sample estimate $\hat{Z}_m$ for each m subcarrier in each k OFDM symbol.

As with the case for the signal power variance determination, the signal-to-noise variation determination unit SNRV-DET can determine as the signal-to-noise variation the signal-to-noise variance. In particular, the determination unit SNRV-DET determines the variance SNRV in accordance with the following equation:

$$SNRV = \frac{1}{N_{ST}} \sum_{m \in N_{ST}} \left| \frac{|\hat{H}_m|^2}{|\hat{Z}_m|^2} - SNRM \right|^2 \quad (4.1)$$

with $$SNRM = \frac{\sum_{m \in N_{ST}} |\hat{H}_m|^2}{\sum_{m \in N_{ST}} |\hat{Z}_m|^2} \text{ (mean } SNR\text{)} \quad (4.2)$$

Figure 13B:
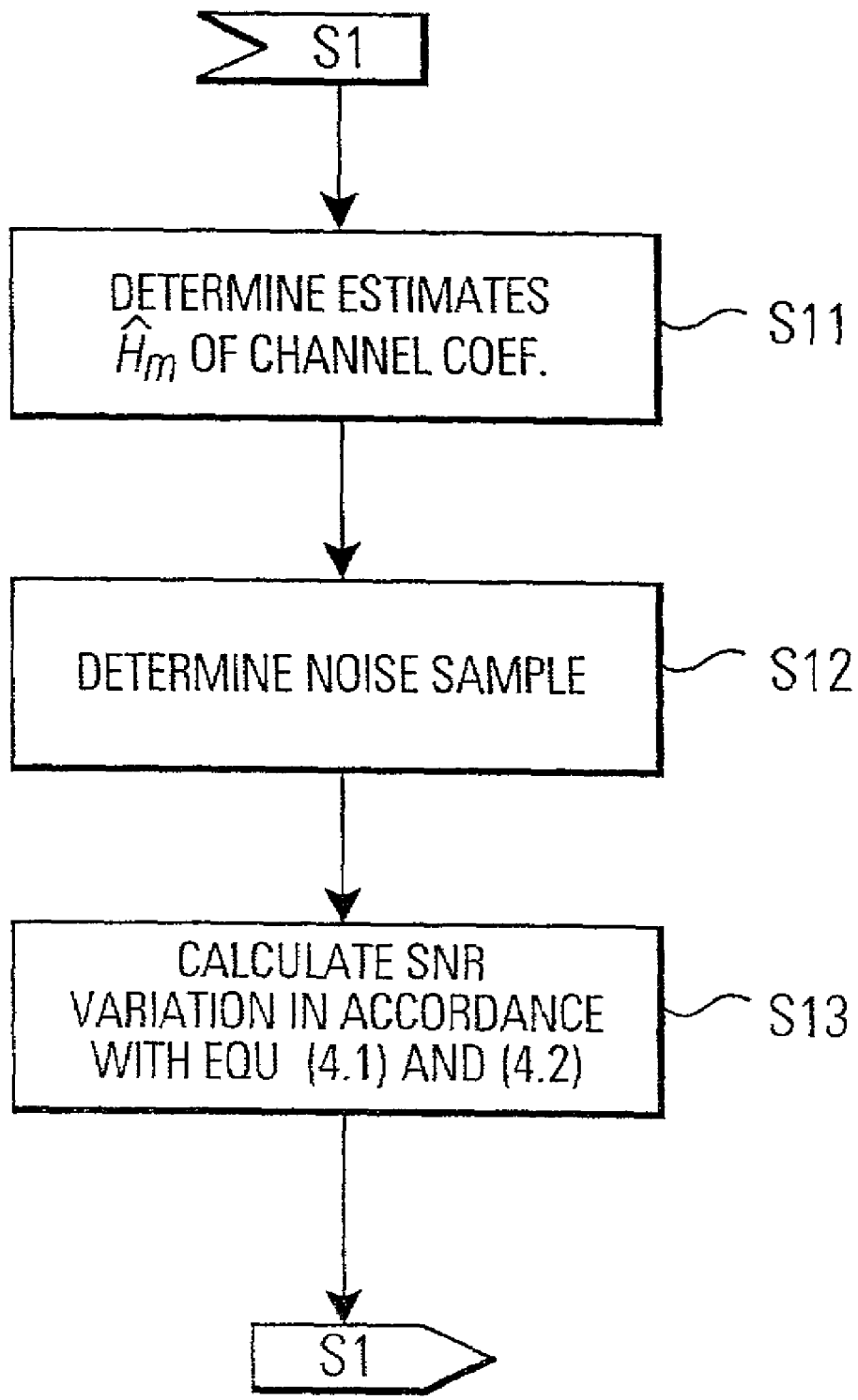
FIG. 13b shows a flowchart for calculating the signal-to-noise variance in accordance with the second embodiment of the invention.

That is, as shown in the flowchart of FIG. 13b, for the case of the signal-to-noise variance determination, the channel estimator first calculates the estimates $\hat{H}_m$ of the channel coefficients in step S11 and in step S12 a noise sample estimate determining unit ZM-DET determines a noise sample estimate $\hat{Z}_m$ for each m subcarrier in each k OFDM symbol.

In step S13 the determination unit SNRV-DET determines the SNR mean value SNRM by respectively summing the power of the channel estimation coefficients $|\hat{H}_m|^2$ and the power of the noise samples $|\hat{Z}_m|^2$ over the plurality of subcarriers $N_{ST}$ and by forming the ratio thereof (see equation 4.2). Then, the determination unit SNRV-DET determines the ratio of the power $|\hat{H}_m|^2$ of the respective channel coefficient estimate for the respective m subcarrier to the power of the respective noise sample estimate $|\hat{Z}_m|^2$ for the respective m subcarrier, subtracts from this ratio the SNR mean value SNRM, determines the absolute value of the subtraction result, squares the absolute value and averages the determined absolute values over a plurality $N_{ST}$ of subcarriers (see equation 4.1).

As explained above with reference to FIG. 4b, also with respect to the signal-to-noise variation determination, the first link quality measure determination unit Q1-DET may be outputting the signal-to-noise variance as the first link quality measure $Q_1$. Again, it should be noted that the signal power variation determination as a signal power variance and the signal-to-noise variation determination as a signal-to-noise variance are only one example of how a respective variation may be calculated. Other implementations for the variations may be carried out on the basis of the teachings disclosed herein.

As explained above, the signal-to-noise variation and/or the signal power variation are used to account for the delay spread affecting the link quality and thus the desired link adaptation in a OFDM communication system. Also a time evaluation over several bursts is possible to calculate an improved variation value (signal power or SNR variation).

Third Embodiment (Noise Power Quality Measure)

Hereinafter, a further embodiment of the invention will be described in which the noise power is being determined. It should be noted that for the calculation of the noise power in the third embodiment a noise sample estimate determining unit ZM-DET is used which may also be used for the signal-to-noise variation as described above (see the above equation (6.2) where the estimates $\hat{Z}_m$ of the noise samples are necessary).

Figure 6:
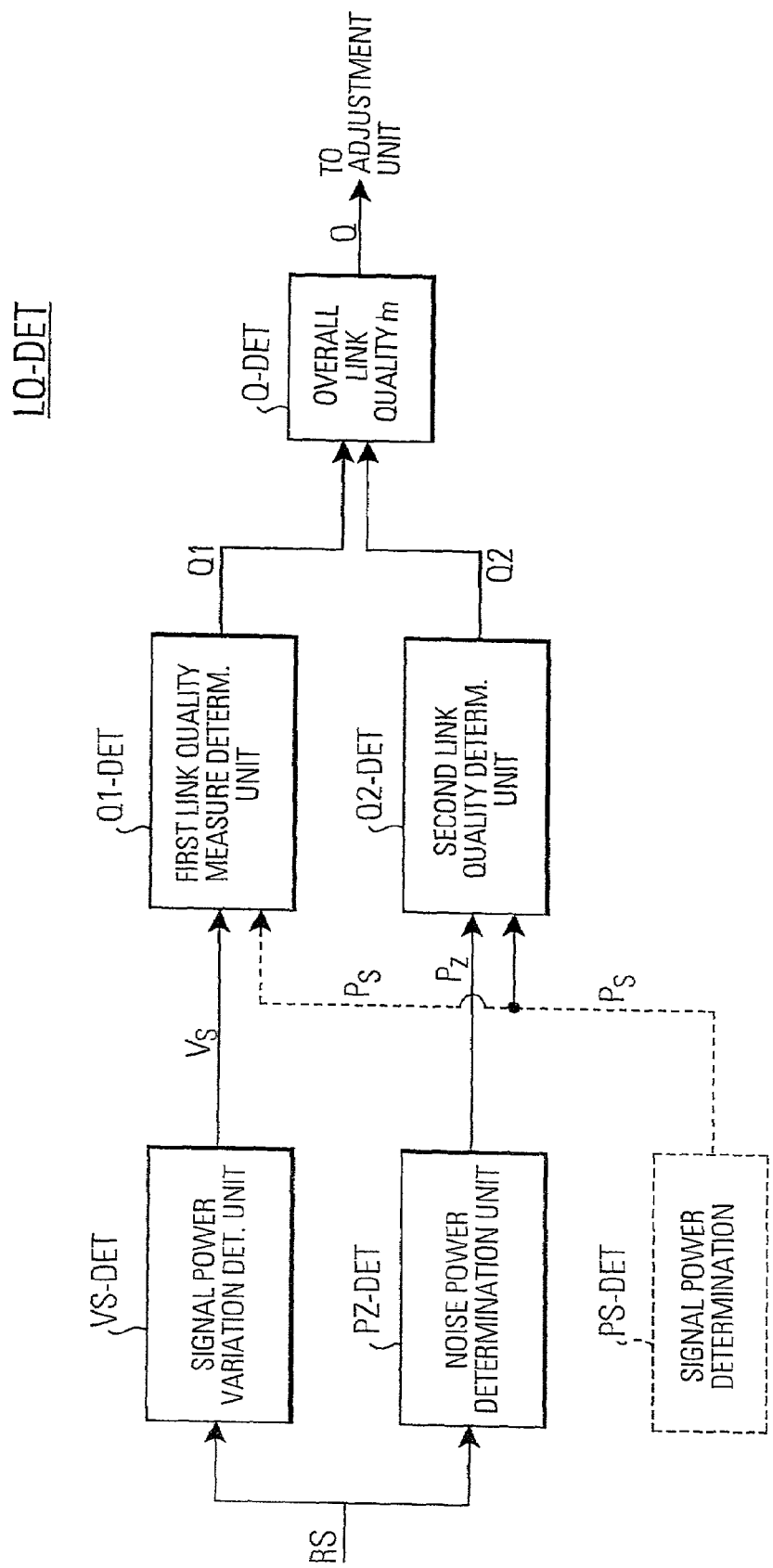
FIG. 6 shows a block diagram of another aspect of the invention where at least a second quality measure determination unit determining a link quality measure based on the signal-to-noise ratio is provided in combination with the first link quality measure determination unit.

As shown in FIG. 6, in addition to the signal power variation determination unit VS-DET and the first link quality determination unit Q1-DET, an additional noise power determination unit PZ-DET adapted to determine the noise power $P_z$ and a second link quality measure determination unit Q2-DET which is adapted to determine a second link quality measure $Q_2$ representing the average subcarrier signal-to-noise power ratio SNR on the basis of the noise power $P_z$ as determined by the noise power determination unit PZ-DET are provided. An overall signal quality measure determination unit Q-DET for determining an overall link quality measure Q by combining the first and second link quality measures $Q_1$, $Q_2$ is provided. Whilst in FIG. 6 the signal power variation determination unit VS-DET, as discussed with reference to FIG. 4a, 4b, is shown, it may be noted that in FIG. 6 the signal-to-noise variation determination unit SNRV-DET (as discussed above with reference to FIG. 5a, 5b) can be provided.

As shown in FIG. 6, the second aspect of the invention is based on the fact that a second link quality measure $Q_2$ is determined which is based on the average subcarrier signal-to-noise power ratio SNR. This average subcarrier signal-to-noise power ratio SNR is to be distinguished from the signal-to-noise variation value as described above with reference to the second embodiment.

The error rate, and hence the throughput, is heavily affected by the SNR. Therefore, an SNR estimate is a straightforward measure to estimate link quality.

There are various possibilities to calculate the average subcarrier signal-to-noise power ratio as the second link quality measure $Q_1$. FIG. 6 shows one embodiment where a signal power determination unit PS-DET is provided which is adapted to determine the signal power $P_s$, for example by averaging the power of the estimated channel coefficients $\hat{H}_m$ mover a plurality $N_{ST}$ of subcarriers. By contrast to the signal-to-noise variation value, as explained above with reference to the second embodiment, the additional second transmission link quality measure $Q_1$ is based on the noise power $P_Z$, more generally on the average signal power to the average noise power. That is, the second link quality measure $Q_2$ is preferably determined in accordance with the following equation:

$$Q_2 = 10\log_{10}\left(\frac{P_S}{P_Z}\right) \quad (5)$$

The signal power determination unit, as schematically illustrated with the reference numeral PS-DET in FIG. 6, calculates the average power $P_s$ in accordance with the abovementioned equation (1). That is, a channel coefficient estimator HM-EST of the receiver RC determines the estimates $\hat{H}_m$ of the channel coefficients for the respective m subcarriers and the power of the estimates of the channel coefficients are averaged over a plurality $N_{ST}$ of subcarriers. Thus, the nominator $P_s$ of equation (5) has been determined.

Figure 7:
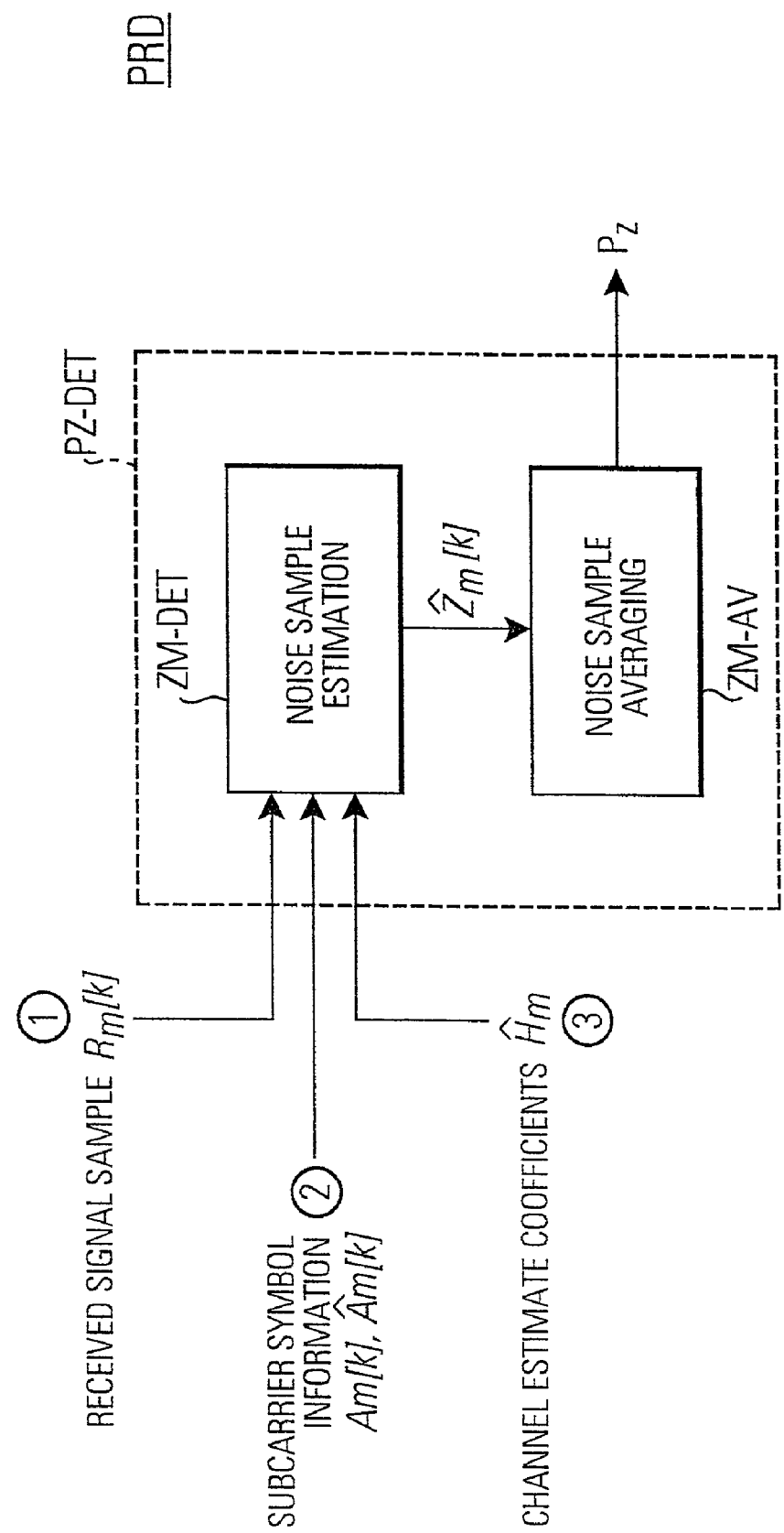
FIG. 7 shows a block diagram of a processing device PRD, in particular a block diagram of the noise power determination unit PC-DET shown in FIG. 6.

Hereinafter, the calculation of the de-nominator $P_z$ is explained. A preferable way how to calculate the noise power $P_z$ with an embodiment of the noise power determination unit PZ-DET is shown in FIG. 7. It may be noted that the noise power determination by a processing device PRD as shown in FIG. 7 is also useful for other purposes in addition to the calculation of the second link quality measure $Q_1$. Therefore, the processing device PRD including the noise power determination unit PZ-DET will be described separately. Such a noise power determination may be advantageously used independently of the link quality measure determination and link adaptation.

The noise power determination unit PZ-DET includes a noise sample estimate determination unit ZM-DET which is adapted to determine a noise sample estimate $\hat{Z}_m$ for each m subcarrier in each k OFDM symbol. Such a noise sample estimate determining unit ZM-DET is also used for providing the signal-to-noise variation determination unit in FIG. 5b of the second embodiment with the necessary noise sample estimates $\hat{Z}_m$.

Furthermore, the noise power determination unit PZ-DET of the processing device PRD comprises a noise sample averaging unit ZM-AV which is adapted to determine the noise power $P_z$ by averaging the noise sample estimate $\hat{Z}_m$ over a plurality $N_{ST}$ of subcarriers. As explained above, the second link quality measure determination unit Q2-DET is adapted to determine the second link quality measure $Q_2$ by determining the ratio of the determined signal power $P_s$ to the determined noise power $P_s$.

The noise power needs to be estimated to obtain an estimate of the signal-to-noise power ratio and may also be used independently in any processing device PRD of an OFDM system. The following method for noise power estimation, as illustrated in FIG. 7, operates in the frequency domain. Hence, it is typically applicable in OFDM systems. On the other hand, whilst the description hereinafter is a preferred embodiment of the present invention, other noise power estimation schemes may be used. The suggested method requires information on transmitted subcarrier symbols and it may work either pilot-assisted (using the training symbols TS), e.g. on the channel estimation part of the HIPERLAN/2 preamble, or decision-directed at any position in a burst.

Figure 9:
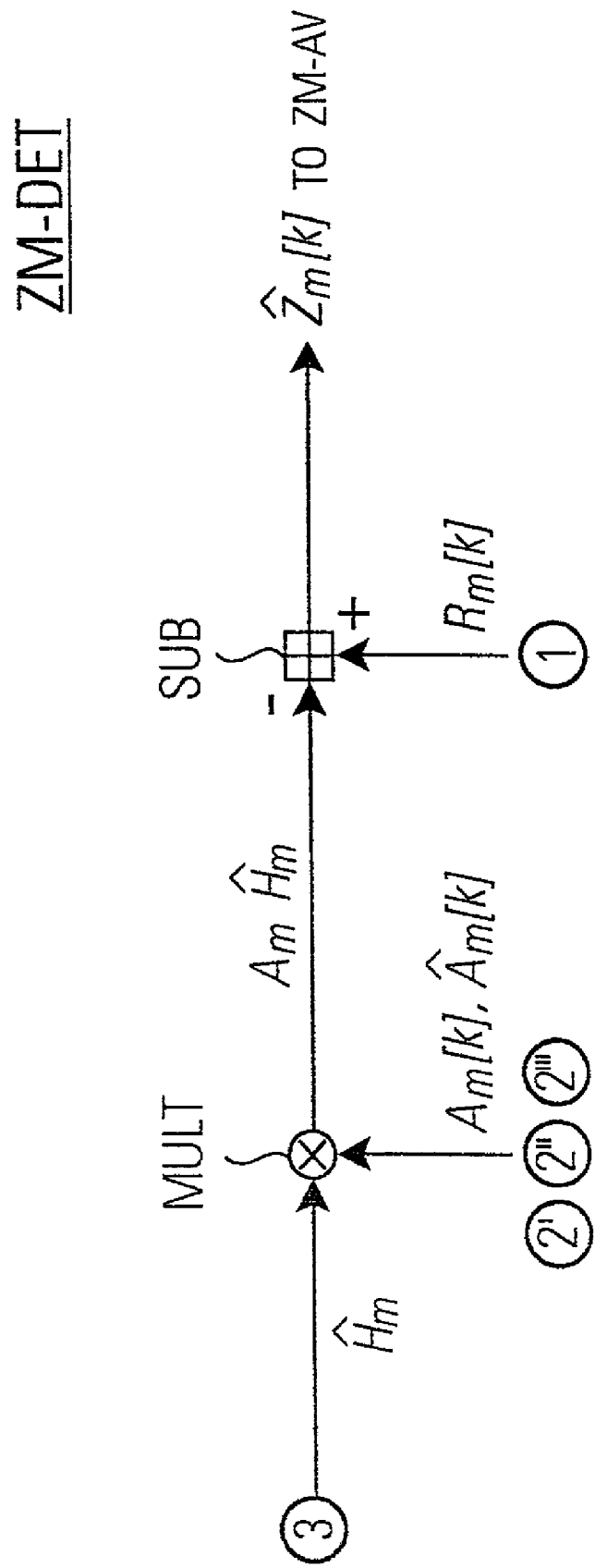
FIG. 9 shows a block diagram of a noise sample determination unit ZM-DET used for calculating the noise power.

On the basis of the original equivalent communication model on subcarriers as shown in FIG. 3, also a noise model can be derived, as shown in FIG. 9. That is, as shown in step S3 in FIG. 12, the noise sample estimate determining unit ZM-DET is adapted to determine the noise sample estimates $\hat{Z}_m$ for each m subcarrier in each k OFDM symbol on the basis of the respective received signal sample $R_m[k]$, ① on the respective m subcarrier in the respective k OFDM symbol, of subcarrier symbol information $A_m[k]$, $\hat{A}_m[k]$, ② about the subcarrier symbol transmitted on the respective m subcarrier in the respective k OFDM symbol, and of the channel coefficient estimate $\hat{H}_m$, ② on the respective subcarrier.

Preferably, the noise sample estimate determination unit ZM-DET as shown in FIG. 7 determines the noise sample estimate $\hat{H}_m$ $\hat{Z}m[k]$ on the basis of the following equation:

$$\hat{Z}_m[k] = R_m[k] - A_m[k]\hat{H}_m \quad (6)$$

Figure 13C:
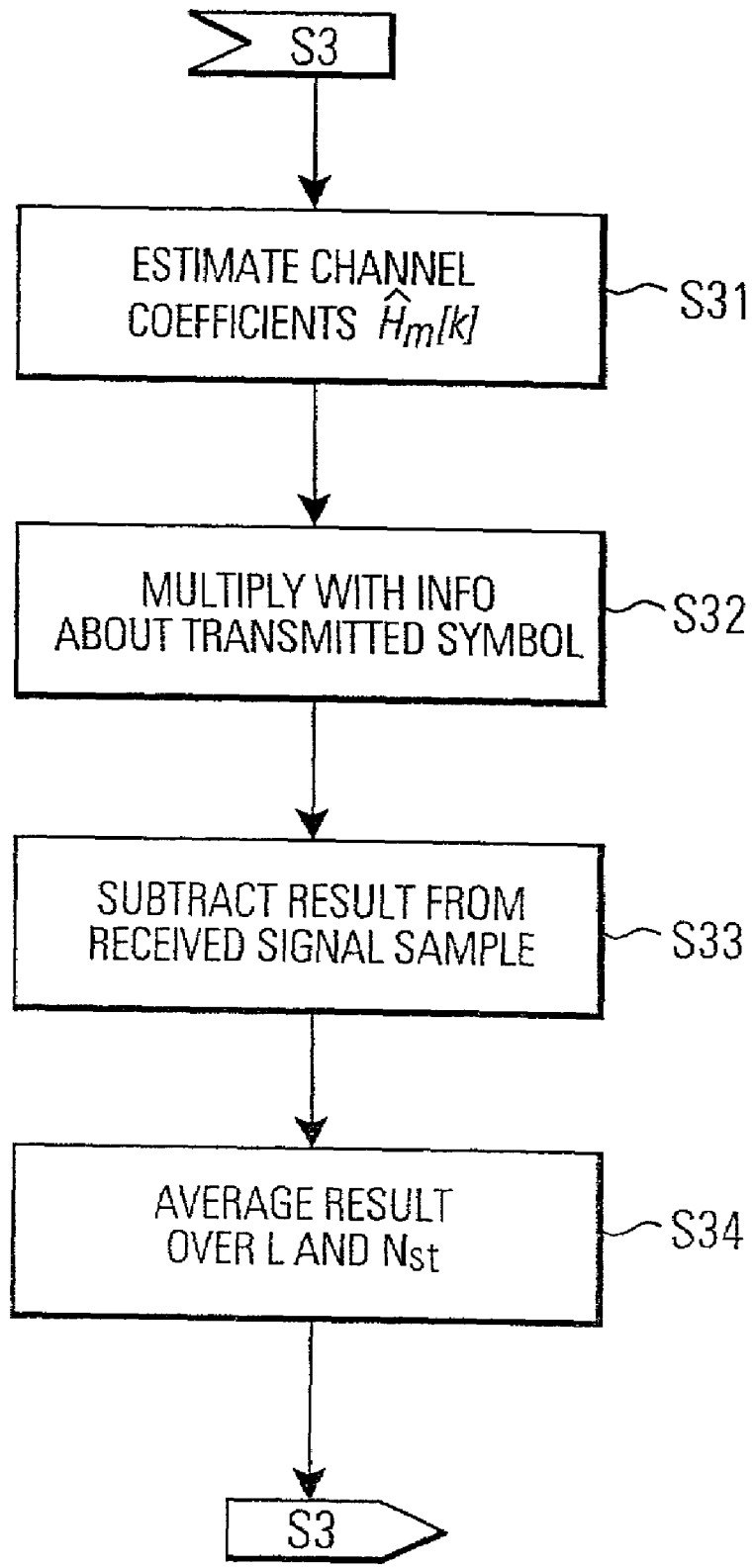
FIG. 13c shows a flowchart for determining the noise power (step S3 in FIG. 12).

This model for the noise sample estimates can easily be derived on the basis of the equivalent subcarrier communication model shown in FIG. 3. As shown in FIG. 13c, in a first step S31 the channel coefficients $\hat{H}_m[k]$ are determined by the channel estimator CH-EST. In a step S32 the multiplier MULT of the noise sample estimate determining unit ZM-DET multiplies the channel coefficient estimate $\hat{H}_m$, ③ on the respective subcarrier with the subcarrier symbol information $A_m[k]$, $\hat{A}_m[k]$, ② and a subtractor SUB subtracts the multiplication result from the respective received signal sample $R_m[k]$, ①. The output of the subtractor SUB constitutes the noise sample estimates $\hat{Z}_m[k]$ for each m subcarrier in each k OFDM symbol.

In step S34 an averaging process over $N_{ST}$ subcarriers and possibly over L OFDM symbols is carried out. This will be explained below with further details. Firstly, with respect to the determination steps S31–S33 for the noise sample estimates $\hat{Z}_m$, it should be understood that the noise model in FIG. 9 requires at least a direct knowledge of the transmitted subcarrier symbols $A_m[k]$ or at least an estimate of the transmitted subcarrier symbols $A_m[k]$. As shown in the following equation for the noise power $P_z$ $$P_Z = \frac{1}{LN_{ST}}\sum_{\lambda=0}^{L-1}\sum_{m\in N_{ST}}|\hat{Z}_m[k+\lambda]|^2 \quad (7)$$

$$= \frac{1}{LN_{ST}}\sum_{\lambda=0}^{L-1}\sum_{m\in N_{ST}}|R_m[k+\lambda] - \hat{A}_m[k+\lambda]\hat{H}_m|^2$$

a direct knowledge or an estimate of the transmitted symbols $\hat{A}_m[k]$ must be obtained.

As already explained above with reference to FIG. 1b, in the OFDM communication system the OFDM symbols are transmitted in bursts BST of a frame FR, each burst BST comprises a preamble part PRE and one or more protocol data units PDU. Each preamble part PRE of each burst BST comprises one or more OFDM training symbols TS, which are used by the channel coefficient estimator HM-EST for the channel estimation.

Figure 8:
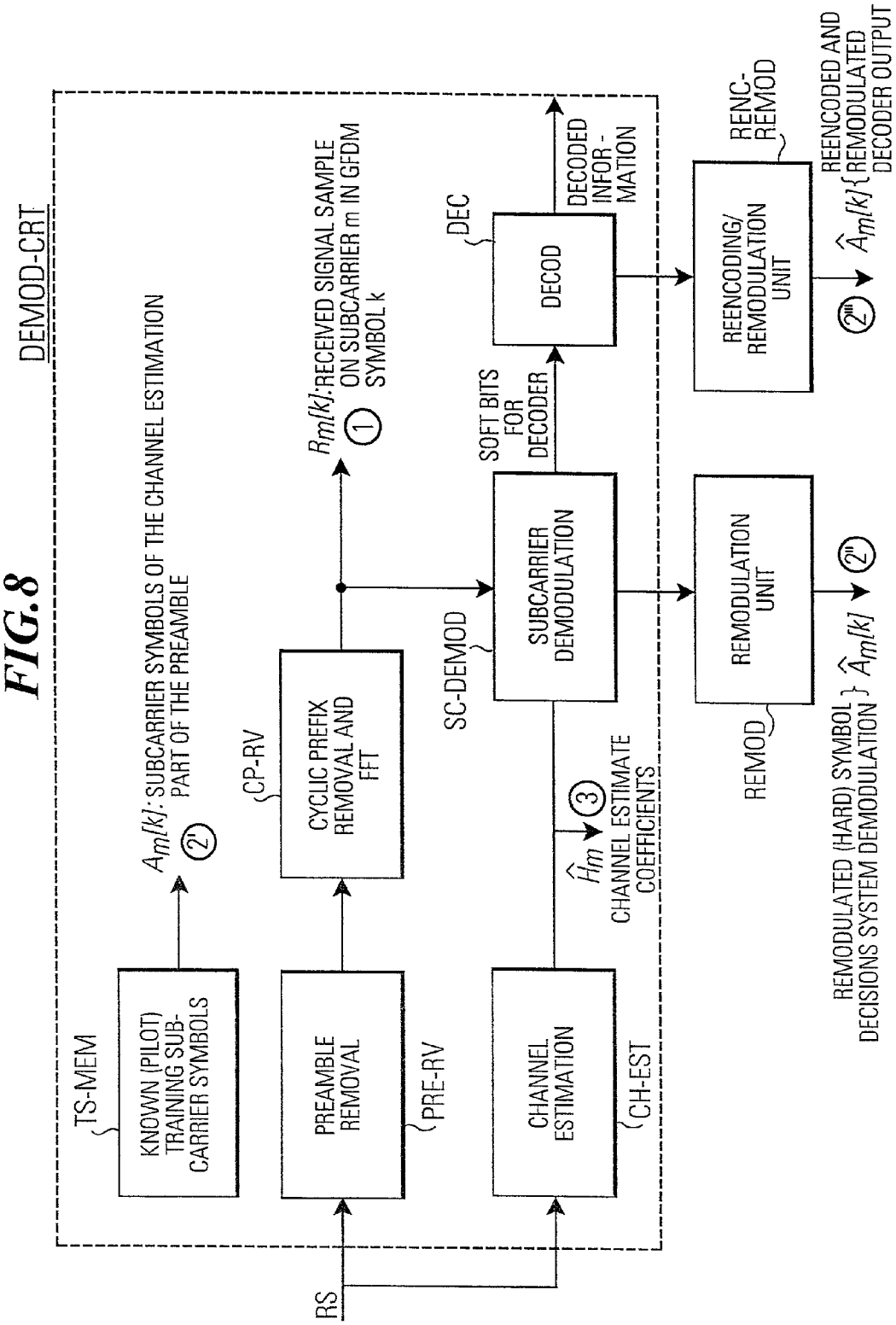
FIG. 8 shows a block diagram of a demodulation circuitry DEMOD-CRT of an OFDM receiver as well as a remodulation unit REMOD and a reencoding/remodulation unit REINC-REMOD used for providing estimates of the subcarrier symbol information based on data-bearing subcarrier symbols within the protocol data units.

The first possibility how information $A_k[k]$ on the subcarrier symbols can be directly obtained is by using the subcarrier symbols of the channel estimation part of the preamble. As shown in FIG. 8, a conventional demodulator circuitry DEMOD-CRT comprises a preamble removal unit PRE-RV, a cyclic prefix removal and FFT unit CP-RV, a channel estimator CH-EST, a subcarrier demodulator SC-DEMOD and a decoder DEC. In order to allow the receiver training, the demodulation circuitry DEMOD-CRT must also have knowledge of some known training symbols TS or pilot symbols which are stored preferably in a memory TS-MEM. The pilot symbols are known both to the transmitter TR and to the receiver RC beforehand.

Thus, a first possibility of providing the necessary information of the transmitted subcarrier symbols is the subcarrier symbol information of one or more OFDM training symbols TS of the preamble part PRE of the burst. That is, if at a certain timing the receiver RC can assume that the preamble part with the agreed and known pilot training symbols is transmitted, then a noise estimation in accordance with equation (6) can be performed on the basis of the pilot symbols.

As also shown in FIG. 8, another possibility of providing some information about the transmitted subcarrier symbols is to use estimates $\hat{A}_m[k]$ of data-bearing subcarrier symbols within a burst. If the estimates are used in equation (6), then equally the required noise sample estimates $\hat{Z}_m[k]$ can be provided by the determination unit ZM-DET.

As shown in FIG. 8, there are again two examples how this information about estimates of the transmitted subcarrier symbols can be provided. One possibility is to generate the subcarrier symbol estimate information $\hat{A}_k[k]$ of data-bearing subcarrier symbols within the protocol data units within a burst by a remodulation unit REMOD which is adapted for remodulation of the OFDM symbol decisions output by the demodulator DEMOD. Such estimated subcarrier symbol information is denoted with reference numeral ②". Thus, the remodulation of (hard) symbol decisions after demodulation can be used for providing the estimates of the transmitted subcarrier symbols. That is, the demodulation circuitry DEMOD-CRT receives a reception signal RS which is the received signal after the filter(s), after downsampling, frequency correction and timing correction. The output of the cyclic prefix removal and FFT unit CP-RV are the received signal samples on the subcarrier m in OFDM symbol k, namely $R_m[k]$ which are also necessary for the noise sample estimation in equation (6) in the frequency domain.

Furthermore, as also shown in FIG. 8, some estimates of the transmitted OFDM symbols can also be carried out by re-encoding/remodulating the output of the decoder DEC conventionally provided in the demodulation circuitry DEMOD-CRT. Also in this case some estimate information $\hat{A}_m[k]$ of the transmitted subcarrier symbol can be fed to the noise sample determination unit ZM-DET. On the basis of the three input information ①, ②, ③ the noise sample determination unit determines the individual noise samples $\hat{Z}_m[k]$ in accordance with equations (6), (7).

In case of decision-directed operation for determining the noise samples it is clear that decision errors will increase the estimation errors for low signal-to-noise power ratios. This can simply be avoided by applying a noise power estimation to the preamble symbols.

Once the direct information on the transmitted symbol $A_m[k]$ or the estimates $\hat{A}_m[k]$ on the transmitted symbols is known, the noise samples can be determined by the unit ZM-DET of the noise power determination unit PZ-DET of the processing device PRD.

In order to obtain an accurate measure for the noise power, the noise sample averaging unit ZM-AV performs a calculation of the noise power based on the noise samples $\hat{Z}_m$ in accordance with the equation (7).

In equation (7) L denotes the number of OFDM symbols over which the noise power shall be averaged. Within one OFDM symbol, noise power is obtained by averaging over for example 52 samples. Hence, measurement variance is reduced by this factor for L=1, which may be sufficient in many cases.

That is, whilst a preferred embodiment of the invention uses an additional averaging of the noise samples also over a plurality L of OFDM symbols, the noise power can already be calculated by the noise sample averaging unit ZM-AV by merely determining an average of the noise sample estimates $\hat{Z}_m$ over a plurality $N_{ST}$ of subcarriers.

Going back, once the noise power has been determined, it is easy to calculate the average subcarrier SNR and thus the second link quality measure Q2 in accordance with equation (5).

As may be seen from equation (7) for the determination of the noise power $P_z$ by averaging the individual noise samples $\hat{Z}_m[k]$, the measurement described above only gives the average noise level within an OFDM symbol. Furthermore, the calculation corresponds, independently as to whether a real pilot symbol or an estimate of a data-bearing OFDM symbol is used, to the influence of white noise. The assumption behind that is that noise or co-channel interference has approximately constant power spectral density (white noise). This assumption is fulfilled in case of a thermal noise. However, there are situations where this assumption is an approximation only or it does not hold at all. For such cases, the approximation with white noise is not applicable and other noise estimates may be found. This is described in the fourth embodiment below.

Fourth Embodiment (Improved Noise Calculation)

The above-described signal-to-noise variation calculation is in particular advantageous for situation in which one or few co-channel interferers are considered via frequency-selective channels. That is, in typical cellular systems with reasonable re-use factors of about 7, there will be a few or even one co-channel interferers. If they are received via a frequency-selective channel, the interference levels on the difference subcarriers will be different. Hence, the information by the noise/interference power measurement in accordance with equation (7) may be incomplete.

In such a situation it is advantageous to calculate an estimation of the average noise/interference power as the instantaneous subcarrier SNR on each subcarrier and to use each subcarrier's SNR to get the mean and the variance of this subcarrier SNR. However, a problem occurs because noise is in principle a random process in the frequency direction as well as in the time direction.

As already explained above, it is therefore possible to additionally average (integrate) the signal-to-noise variance (variation) also in the time direction. This leads to higher accuracy. Therefore, a further alternative, as also explained above, is to first average in the time direction to obtain the noise power on each subcarrier separately rather accurately. A mean and variance of either noise power or SNR then leads to reasonable exact measurements. There is, however, the drawback of increased complexity by comparison to the calculation of only the signal power variance as indicated with equation (3).

Fifth Embodiment (Link Adaptation)

In FIG. 12 a principle flow diagram of the invention by combining the first and second transmission link quality measures $Q_1$, $Q_2$ is illustrated. As described above, in step S1 the respective variation is determined and in step S2 the first link quality measure $Q_1$ is determined (FIG. 4a, 4b; FIG. 5a, 5b).

In step S3 the noise power is calculated (FIG. 6, 7, 8, 9) and in step S4 a second link quality measure $Q_2$ is determined on the basis of the noise power, e.g. the average SNR.

In step S5 an overall link quality measure determination unit Q-DET, as shown in FIG. 6, combines the first and second link quality measures $Q_1$, $Q_2$ in order to determine an overall link quality measure Q which is then used by the transmission property decider TL-DEC to select the appropriate transmission properties (physical layer mode) for the OFDM transmission link. Based on the decision of the transmission property decider TR-DEC the transmission property adjustment unit ADP will set the selected transmission property (physical layer mode). Alternatively, of course the transmission property decision and the transmission property adjustment may be based only on the first or second link quality measure $Q_1$, $Q_2$.

In any case, independent as to whether the link quality measurement is based on Q, $Q_1$ or $Q_2$, a simple link adaptation LA (including the transmission property decision based on the link quality measure and the transmission property setting) may use one link quality measure per burst. For example, in a mobile terminal MT the broadcast channel BCCH at the frame start may be evaluated to obtain a link quality measure and a physical layer mode may be decided by the transmission property decider TR-DEC residing in the mobile terminal MT. This physical layer mode proposal may be sent to the access point AP either in the random access channel RAC or in an uplink channel traffic. Once again, the access point AP can calculate a link quality measure based on the random access RAC which is likely to be performed in the most robust burst mode in any case. Then the access point AP can assign the respective resources based on the physical layer mode proposed by the mobile terminal MT and based on the physical layer mode which the access point AP has determined based on the evaluation in the random access mode.

Figure 10:
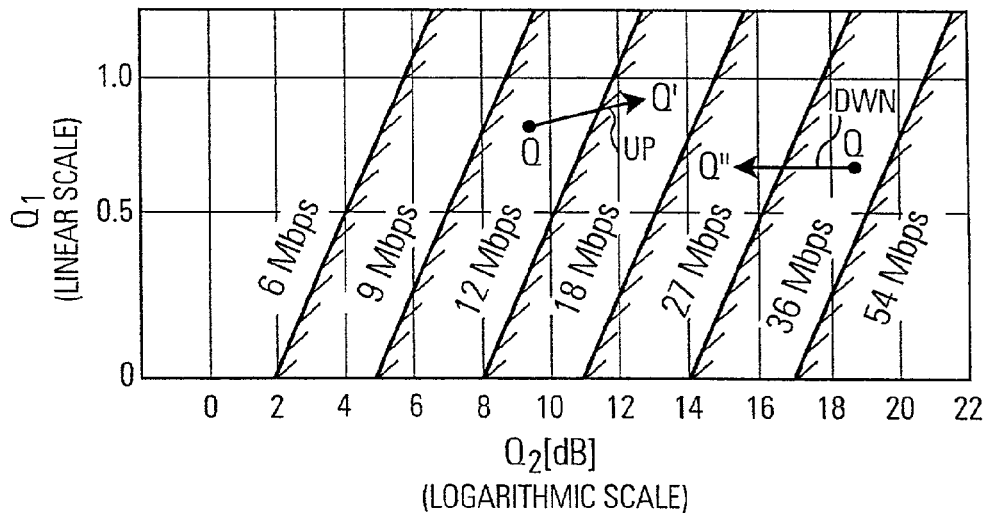
FIG. 10 shows a mapping diagram for combining the first and second link quality measures Q1, Q2 into a common decision map.

FIG. 10 shows an example how the overall link quality measure determination unit Q-DET combines the first and second link quality measures $Q_1$, $Q_2$ in step S5 in FIG. 12. As shown in FIG. 10, the first link quality measure $Q_1$ and the second link quality measure $Q_2$ are arranged in a decision plane, wherein the first link quality measure Q1 (being normalized) has a linear scale on the vertical axis and the second link quality measure $Q_2$ being based on the logarithm, has a logarithmic scale on the horizontal axis.

As may be understood from FIG. 10, the overall link quality measure Q is the combination of $Q_1$ and $Q_2$, i.e. it may be viewed to be present on a third axis which is perpendicular to the horizontal and vertical axis of $Q_2$ and $Q_1$.

FIG. 10 also shows the decision lines (or decision planes) of the transmission link property decider TL-DEC. These decision lines (planes) are examples to illustrate the decision on the physical layer modes dependent on the values of the overall link quality measure Q. These decision lines are of course single decision points if only a single link quality measure $Q_1$ or $Q_2$ is used for the transmission property decision.

In the combined decision plane in FIG. 10 the values of $Q_1$ and $Q_2$ are previously determined and the appropriate physical layer mode is decided based on the decision plane location of the overall link quality measure Q in the decision plane.

Figure 11:
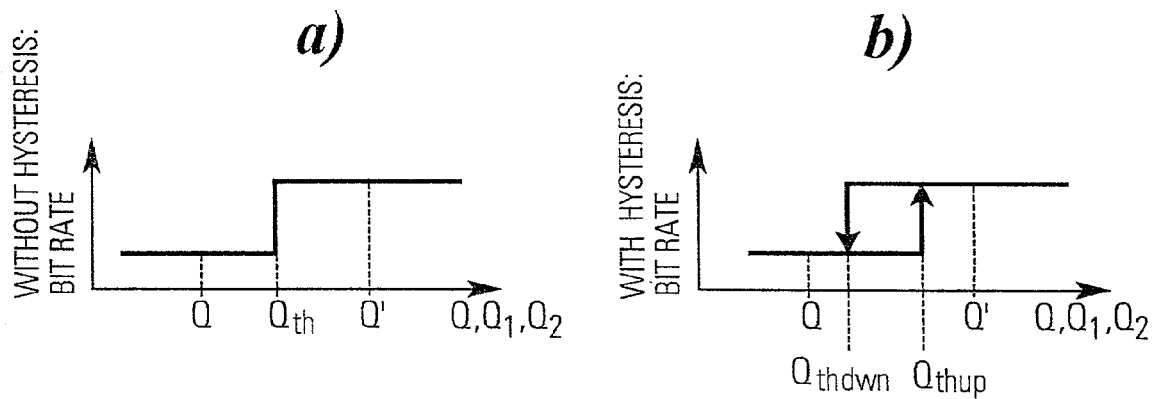
FIG. 11 shows the usage of a hysteresis for link adaptation.

As indicated with the arrows in FIG. 10, when the overall link quality measure is determined at two separate instances in time leading to Q, Q' (for example two different bursts of the same frame or two bursts in two different frames may be evaluated), then in case UP the physical layer mode switching will increase the bit rate and in case DWN the physical layer mode switching will decrease the bit rate, for example. In both cases, the mode switching is even in the two-dimensional plane in FIG. 10 always carried out digitally at the decision line, as shown in FIG.11a). As shown in FIG. 11a, whenever the single quality measure $Q_1$, $Q_2$ or the overall link quality measure Q exceeds or falls under the threshold $Q_{th}$, a kind of digital switching of the bit rate (physical layer mode) without a hysteresis is carried out.

Alternatively, as shown in FIG. 11b, the mode switching may be carried out by including a hysteresis. That is, whenever the single or the overall link quality measure Q, $Q_1$, $Q_2$ exceeds an up-switching threshold $Q_{thup}$ in the upward direction the switching will be carried out at this upward threshold $Q_{thup}$. If the single link quality measure $Q_1$, $Q_2$ or the overall link quality measure decreases from Q' to Q, then the downswitching of the bit rate will only take place at a lower threshold of $Q_{thdwn}$. The introduction of the hysteresis has the effect that an increase of the bit rate occurs at slightly higher SNRs than the decrease. The obvious advantage is to avoid very frequent mode changes which may occur if instantaneous actual channel characteristics are nearby the decision line during some time.

It may be noted that the switching including using a hysteresis can be used for the overall link quality measure Q as well as for the individual single first and second link quality measures $Q_2$, $Q_1$. In the one-dimensional case ($Q_1$ or $Q_2$) the decision of mode switching will take place at a decision point rather than a decision line. If the overall link quality measure Q is used in the three-dimensional case, then the decision planes may not be plain but may be a two-dimensional bend surface in three-dimensional Q, $Q_2$, $Q_1$ space.

Sixth Embodiment (Improved Link Adaptation)

In the baseline link adaptation scheme only one link quality measure value per burst is calculated. This may for instance happen in the broadcast channel BCCH in the downlink or the random access channel RAC in the uplink. Of course, it is possible to calculate one link quality measure in any other downlink or uplink channel.

In environments with dominating interference the interference power may, however, be quickly fluctuating from MAC frame to MAC frame or even within frames. In such a situation one or a few measurements for the whole frame may lead to wrong decisions on the physical layer mode switching.

An extreme example is that the mobile terminal (the receiver) calculates the link quality measure in the broadcast channel BCCH which may not be interfered at all because the respective co-channel interferer does not use the MAC frame during this period. In this case, the mobile terminal MT will decide on a mode with the highest bit rate. If most of the remaining frame, however, is disturbed by significant interference with e.g. 5 dB SNR ratio, the throughput in the downlink decreases to zero. Actually, due to the high interference, a link throughput in the order of 5 Mbps should have been selected. That is, even if in step S6 more link quality measures are calculated at the different positions in the frame or more bursts are evaluated ("J" in step S6), it may happen that the individual usage of a single measurement per burst or frame may lead to incorrect physical layer mode decisions.

In this case, one possible approach to avoid erroneous link adaptation decisions in such cases is to estimate the link quality at several instances during a MAC frame or even during the bursts. That is, for example the second link quality measure determination unit Q2-DET can determine the second link quality measure $Q_2$ at several instances during a frame or during bursts and can calculate a modified second link quality measure as a cumulative density function c.d.f. of $Q_2$ in step S7. Then, a certain percentage x% of measurements that exceed a desired $Q_2$ threshold can be used for a decision on the physical layer mode switching as described above. In this case, x% of the traffic operates under reasonable conditions whereas communication of (100-x)% of the data fails due to severe interference. Preferably, x=90 is a suitable choice.

Improved link adaptation can also be obtained on the basis of the following two aspects. Whilst above the respective quality measures $Q_1$, $Q_2$, Q were determined on the basis of the signal power variation (equation (3)), the SNR variation (equations (4.1) and (4.2)) and the signal/noise power ratio (equation (5)) at a single instance in time to, i.e. $Q_1=Q_1(to)$, $Q_2=Q_2(to)$ and $Q=Q(to)$, it is also possible to perform a time averaging of the respective measure $Q_1$ and $Q_2$ and possibly also of the overall link quality measure Q, that is $Q_1'=1/Nt\Sigma Q_1(t)$, $Q_2'=1/Nt\Sigma Q_2(t)$, $Q'=1/Nt\Sigma Q(t)$ where Nt is the number of time instances over which the values are to be summed up and the sum $\Sigma$ is to be taken over the Nt time instances. The transmission link property decider TL-DEC can then decide the transmission link property on the basis of the time averaged signal quality measure $Q_1'$, $Q_2'$, $Q'$.

Furthermore, it was mentioned above that the transmission link property decider TL-DEC decides as the transmission property the physical layer mode which is then set by the transmission property adjustment unit ADP in the transmitter TR. However, it may be noted that the transmission link property decider TL-DEC can also decide, on the basis of the link quality measure Q, $Q_1$, $Q_2$ or $Q'$, $Q_1'$, $Q_2'$, as the transmission property the transmission power to be used in the transmitter TR for the transmissions, for example by using the decision lines or planes in FIG. 10 as power level decision lines or planes.

INDUSTRIAL APPLICABILITY

As explained above, in accordance with the first and second embodiment of the invention a variation of a relevant parameter in the OFDM system is evaluated for determining a link quality measure. Such variations can be the signal power variation (first embodiment) or the SNR variation (second embodiment). Furthermore, in addition to the aforementioned first link quality measure a second link quality measure can be calculated based on the noise power evaluation in the OFDM system (third embodiment). In accordance with a fourth embodiment of the invention the first and second link quality measures can be combined in order to perform a more accurate link adaptation. In accordance with the fifth embodiment of the invention a cumulative density function of several link quality measures evaluated at several instances during a burst or during a frame or between frames is calculated in order to further improve the link adaptation (physical layer mode switching) accuracy.

The present invention also has the advantage to suggest a method how a SNR estimate can be found in OFDM systems. Such a SNR estimate is often a suitable link quality measure. Furthermore, the present invention provides the advantage that a technique is suggested how to combine link quality measures and use the overall link quality measure by the radio resource management. The particular advantage of the present invention is of course that the taking into account of signal power or SNR variations (e.g. the variance thereof) accounts for the instantaneous channel frequency response. Thus, the link quality measures in accordance with the invention include channel parameters like the delay spread which affect the link quality and hence the desired link adaptation behaviour and the switching criteria. The link quality measures of the present invention take into account such effects.

Thus, the present invention provides a new concept for link quality measurements which can be used in OFDM systems, in particular in HIPERLAN/2 and IEEE 802.11.

Furthermore, it should be noted that the present invention is not restricted to the disclosure herein. Further advantageous modifications and variations of the invention can be carried out by a skilled person on the basis of the present disclosure which is conceived by the inventors as the best mode of the invention. Furthermore, the invention may comprise further advantageous embodiments which consist of a combination of separately described features and/or steps listed in the description and in the claims.

Furthermore, reference numerals in the claims only serve clarification purposes and do not limit the scope of these claims.

The invention claimed is:

1. A link quality determination unit for determining a link quality of a transmission link between an OFDM transmitter and an OFDM receiver of an OFDM transmission system, wherein:

said link quality determination unit comprises a signal power variation determining unit adapted to determine the signal power variation of the reception signal in the receiver and at least a first link quality measure determination unit adapted to determine a first link quality measure representing the variation of the subcarrier signal power on the basis of the signal power variation as determined by the signal power variation determining unit;

said link quality determination unit further comprising:

a channel coefficient estimator which is adapted to determine estimates of the channel coefficients for the respective subcarriers;

a signal power determining unit which is adapted to determine the signal power by averaging the power of the estimated channel coefficients over a plurality of subcarriers; and wherein:

said signal power variation determining unit is adapted to determine, as the signal power variation, the signal power variance by determining the difference between the power of the estimated channel coefficients on the respective subcarrier and the signal power, by determining the absolute value of the difference, by squaring the absolute value of the difference, and by averaging the squared absolute value over a plurality of subcarriers.

2. A link quality determination unit according to claim 1, wherein:
said first link quality measure determination unit is adapted to determine said first link quality measure by determining a ratio of the signal power variation to the squared signal power.

3. A link quality determination unit for determining a link quality of a transmission link between an OFDM transmitter and an OFDM receiver of an OFDM transmission system, wherein:
said link quality determination unit comprises a signal-to-noise variation determining unit adapted to determine the signal-to-noise variation of the reception signal in the receiver and at least a first link quality measure determination unit adapted to determine a first link quality measure representing the variation of the signal-to-noise ratio on the basis of the signal-to-noise variation as determined by the signal-to-noise variation determining unit;
said link quality determination unit further comprising:
a channel coefficient estimator which is adapted to determine estimates of the channel coefficients for the respective subcarriers; and
a noise sample estimate determining unit which is adapted to determine a noise sample estimate for each subcarrier in each OFDM symbol; wherein
said signal-to-noise variation determining unit is adapted to determine as the signal-to-noise variation the signal-to-noise variance by determining a SNR mean value by respectively summing the power of the channel estimation coefficients and the power of the noise samples over the plurality of subcarriers and by forming the ratio thereof and by determining the ratio of the power of the respective channel coefficient estimate for the respective subcarrier to the power of the respective noise sample estimate for the respective subcarrier, by subtracting from this ratio the SNR mean value, determining the absolute value of the subtraction result, squaring the absolute value and averaging the determined absolute values over a plurality of subcarriers.

4. A link quality determination unit according to claim 1, further comprising:
a noise power determination unit adapted to determine the noise power; and
a second link quality measure determination unit which is adapted to determine a second link quality measure representing the average subcarrier signal-to-noise power ratio on the basis of the noise power as determined by the noise power determination unit.

5. A link quality determination unit according to claim 3, further comprising:
a noise power determination unit adapted to determine the noise power; and a
second link quality measure determination unit which is adapted to determine a second link quality measure representing the average subcarrier signal-to-noise power ratio on the basis of the noise power as determined by the noise power determination unit.

6. A link quality determination unit according to claim 4, further comprising:
a channel coefficient estimator which is adapted to determine estimates of the channel coefficients for the respective subcarriers;
a signal power determining unit which is adapted to determine the signal power by averaging the power of the estimated channel coefficients over a plurality of subcarriers;
said noise power determination unit including a noise sample estimate determining unit which is adapted to determine a noise sample estimate for each subcarrier in each OFDM symbol; and
a noise sample averaging unit which is adapted to determine the noise power by averaging the squared absolute values of the noise sample estimates over a plurality of subcarriers,
wherein said second link quality measure determination unit is adapted to determine said second link quality measure by determining the ratio of the determined signal power to said determined noise power.

7. A link quality determination unit according to claim 5, further comprising:
a channel coefficient estimator which is adapted to determine estimates of the channel coefficients for the respective subcarriers;
a signal power determining unit which is adapted to determine the signal power by averaging the power of the estimated channel coefficients over a plurality of subcarriers;
said noise power determination unit including a noise sample estimate determining unit which is adapted to determine a noise sample estimate for each subcarrier in each OFDM symbol; and
a noise sample averaging unit which is adapted to determine the noise power by averaging the squared absolute values of the noise sample estimates over a plurality of subcarriers,
wherein said second link quality measure determination unit is adapted to determine said second link quality measure by determining the ratio of the determined signal power to said determined noise power.

8. A link quality determination unit according to claim 6, wherein:
said noise sample averaging unit is further adapted to determine the noise power by averaging said noise sample estimate power also over a plurality of OFDM symbols.

9. A link quality determination unit according to claim 7, wherein:
said noise sample averaging unit is further adapted to determine the noise power by averaging said noise sample estimate power also over a plurality of OFDM symbols.

10. A link quality determination unit according to claim 6, wherein:
said noise sample estimate deter mining unit is adapted to determine said noise sample estimates for each subcarrier in each OFDM symbol on the basis of the respective received signal sample on the respective subcarrier in the respective OFDM symbol, of subcarrier symbol information about the subcarrier symbol transmitted on the respective subcarrier in the respective OFDM symbol, and of the channel coefficient estimate on the respective subcarrier.

11. A link quality determination unit according to claim 7, wherein:

said noise sample estimate determining unit is adapted to determine said noise sample estimates for each subcarrier in each OFDM symbol on the basis of the respective received signal sample on the respective subcarrier in the respective OFDM symbol, of subcarrier symbol information about the subcarrier symbol transmitted on the respective subcarrier in the respective OFDM symbol, and of the channel coefficient estimate on the respective subcarrier.

12. A link quality determination unit according to claim 3, wherein:
said noise sample estimate determining unit is adapted to determine said noise sample estimates for each subcarrier in each OFDM symbol on the basis of the respective received signal sample on the respective subcarrier in the respective OFDM symbol, of subcarrier symbol information about the subcarrier symbol transmitted on the respective subcarrier in the respective OFDM symbol, and of the channel coefficient estimate on the respective subcarrier.

13. A link quality determination unit according to claim 10, wherein:
said noise sample estimate determining unit comprises a multiplier for multiplying the channel coefficient estimate on the respective subcarrier with the subcarrier symbol information and a subtractor for subtracting the multiplication result from the respective received signal sample, the output of the subtractor constituting said noise sample estimates for each subcarrier in each OFDM symbol.

14. A link quality determination unit according to claim 11, wherein:
said noise sample estimate determining unit comprises a multiplier for multiplying the channel coefficient estimate on the respective subcarrier with the subcarrier symbol information and a subtractor for subtracting the multiplication result from the respective received signal sample, the output of the subtractor constituting said noise sample estimates for each subcarrier in each OFDM symbol.

15. A link quality determination unit according to claim 12, wherein:
said noise sample estimate determining unit comprises a multiplier for multiplying the channel coefficient estimate on the respective subcarrier with the subcarrier symbol information and a subtractor for subtracting the multiplication result from the respective received signal sample, the output of the subtractor constituting said noise sample estimates for each subcarrier in each OFDM symbol.

16. A link quality determination unit according to claim 3, wherein:
said noise sample estimate determining unit comprises a multiplier for multiplying the channel coefficient estimate on the respective subcarrier with the subcarrier symbol information and a subtractor for subtracting the multiplication result from the respective received signal sample, the output of the subtractor constituting said noise sample estimates for each subcarrier in each OFDM symbol.

17. A link quality determination unit according to claim 1, wherein:
the OFDM symbols are transmitted in bursts of a frame, each burst comprises a preamble part and one or more protocol data units and each preamble part of each burst comprises one or more OFDM training symbols used by the channel coefficient estimator for the channel estimation.

18. A link quality determination unit according to claim 3, wherein:
the OFDM symbols are transmitted in bursts of a frame, each burst comprises a preamble part and one or more protocol data units and each preamble part of each burst comprises one or more OFDM training symbols used by the channel coefficient estimator for the channel estimation.

19. A link quality determination unit according to claim 10, wherein:
the OFDM symbols are transmitted in bursts of a frame, each burst comprises a preamble part and one or more protocol data units and each preamble part of each burst comprises one or more OFDM training symbols used by the channel coefficient estimator for the channel estimation; and
said subcarrier symbol information is the subcarrier symbol information of the one or more OFDM training symbols of the preamble part of a burst.

20. A link quality determination unit according to claim 11, wherein:
the OFDM symbols are transmitted in bursts of a frame, each burst comprises a preamble part and one or more protocol data units and each preamble part of each burst comprises one or more OFDM training symbols used by the channel coefficient estimator for the channel estimation; and
said subcarrier symbol information is the subcarrier symbol information of the one or more OFDM training symbols of the preamble part of a burst.

21. A link quality determination unit according to claim 12, wherein:
the OFDM symbols are transmitted in bursts of a frame, each burst comprises a preamble part and one or more protocol data units and each preamble part of each burst comprises one or more OFDM training symbols used by the channel coefficient estimator for the channel estimation; and
said subcarrier symbol information is the subcarrier symbol information of the one or more OFDM training symbols of the preamble part of a burst.

22. A link quality determination unit according to claim 10, wherein:
the OFDM symbols are transmitted in bursts of a frame, each burst comprises a preamble part and one or more protocol data units and each preamble part of each burst comprises one or more OFDM training symbols used by the channel coefficient estimator for the channel estimation; and
said subcarrier symbol information is a subcarrier symbol estimate information of data-bearing subcarrier symbols within the data packet units within a burst.

23. A link quality determination unit according to claim 11, wherein:
the OFDM symbols are transmitted in bursts of a frame, each burst comprises a preamble part and one or more protocol data units and each preamble part of each burst comprises one or more OFDM training symbols used by the channel coefficient estimator for the channel estimation; and
said subcarrier symbol information is a subcarrier symbol estimate information of data-bearing subcarrier symbols within the data packet units within a burst.

24. A link quality determination unit according to claim 12, wherein:
the OFDM symbols are transmitted in bursts of a frame, each burst comprises a preamble part and one or more protocol data units and each preamble part of each burst comprises one or more OFDM training symbols used by the channel coefficient estimator for the channel estimation; and
said subcarrier symbol information is a subcarrier symbol estimate information of data-bearing subcarrier symbols within the data packet units within a burst.

25. A link quality determination unit according to claim 22, wherein:
said subcarrier symbol estimate information of data-bearing subcarrier symbols within the protocol data units within a burst is generated by a remodulation unit which is adapted for remodulating of OFDM symbol decisions output by the demodulator.

26. A link quality determination unit according to claim 23, wherein:
said subcarrier symbol estimate information of data-bearing subcarrier symbols within the protocol data units within a burst is generated by a remodulation unit which is adapted for remodulating of OFDM symbol decisions output by the demodulator.

27. A link quality determination unit according to claim 24, wherein:
said subcarrier symbol estimate information of data-bearing subcarrier symbols within the protocol data units within a burst is generated by a remodulation unit which is adapted for remodulating of OFDM symbol decisions output by the demodulator.

28. A link quality determination unit according to claim 19, wherein:
said subcarrier symbol estimate information of data-bearing subcarrier symbols within the protocol data units within a burst is generated by a reencoding/remodulation unit which is adapted for re-encoding/remodulating of the output by the decoder.

29. A link quality determination unit according to claim 20, wherein:
said subcarrier symbol estimate information of data-bearing subcarrier symbols within the protocol data units within a burst is generated by a reencoding/remodulation unit which is adapted for re-encoding/remodulating of the output by the decoder.

30. A link quality determination unit according to claim 21, wherein:
said subcarrier symbol estimate information of data-bearing subcarrier symbols within the protocol data units within a burst is generated by a reencoding/remodulation unit which is adapted for re-encoding/remodulating of the output by the decoder.

31. A link quality determination unit according to claim 4, wherein:
said second ink quality measure determination unit determines the second link quality measure at several instances during a frame or during bursts and calculates a modified second link measure as a cumulative density function.

32. A link quality determination unit according to claim 5, wherein:
said second link quality measure determination unit determines the second link quality measure at several instances during a frame or during bursts and calculates a modified second link measure as a cumulative density function.

33. A link quality determination unit according to claim 1, further comprising:
a noise power determination unit adapted to determine the noise power; and
a second link quality measure determination unit which is adapted to determine a second link quality measure representing the average subcarrier signal-to-noise power ratio on the basis of the noise power as determined by the noise power determination unit; and
wherein said link quality determination unit comprises an overall link quality measure determination unit for determining an overall link quality measure by combining the first and second link quality measures.

34. A link quality determination unit according to claim 3, further comprising:
a noise power determination unit adapted to determine the noise power; and
a second link quality measure determination unit which is adapted to determine a second link quality measure representing the average subcarrier signal-to-noise power ratio on the basis of the noise power as determined by the noise power determination unit; and
wherein said link quality determination unit comprises an overall link quality measure determination unit for determining an overall link quality measure by combining the first and second link quality measures.

35. A transmission link property selector including a transmission link property decider for selecting transmission properties of an OFDM transmission link depending on a transmission link quality measure, wherein:
said transmission link property selector comprises a link quality determining unit in accordance with claim 1 for outputting said link quality measure, and said transmission link property decider is adapted to decide on the transmission properties of said transmission link on the basis of the link quality measure output by the link quality determination unit.

36. A selector in accordance with claim 35, wherein:
said transmission link property decider is adapted to decide, on the basis of the link quality measure, as the transmission property the physical layer mode used for the OFDM transmission.

37. A selector in accordance with claim 35, wherein:
said transmission link property decider is adapted to decide between different physical layer modes by using a hysteresis.

38. A selector in accordance with claim 35, wherein:
said transmission link property decider is adapted to decide, on the basis of the link quality measure, as the transmission property the transmission power used for the OFDM transmission.

39. A processing device of an OFDM system including a noise power determination unit adapted to determine the noise power of a received signal in an OFDM system, comprising:
a noise sample estimate determining unit which is adapted to determine a noise sample estimate for each subcarrier in each OFDM symbol; and
a noise sample averaging unit which is adapted to determine the noise power by averaging the noise sample estimate power over one or more subcarriers;
wherein said noise power determining unit is further adapted to determine the noise power by averaging said noise sample estimate power also over one or more OFDM symbols; and
wherein said noise sample estimate determining unit is adapted to determine said noise sample estimates for each subcarrier in each OFDM symbol on the basis of the respective received signal sample on the respective subcarrier in the respective OFDM symbol, of subcarrier symbol information about the subcarrier symbol transmitted on the respective subcarrier in the respective OFDM symbol, and of the channel coefficient estimate on the respective subcarrier;

wherein said noise sample estimate determining unit comprises a multiplier for multiplying the channel coefficient estimate on the respective subcarrier with the subcarrier symbol information and a subtractor for subtracting the multiplication result from the respective received signal sample, the output of the subtractor constituting said noise sample estimates for each subcarrier in each OFDM symbol.

40. A processing device according to claim 39, wherein the OFDM symbols are transmitted in bursts of a frame, each burst comprises a preamble part and one or more protocol data units and each preamble part of each burst comprises one or more OFDM training symbols used by the channel coefficient estimator for the channel estimation.

41. A processing device according to claim 40, wherein said noise sample estimate determining unit comprises a multiplier for multiplying the channel coefficient estimate on the respective subcarrier with the subcarrier symbol information and a subtractor for subtracting the multiplication result from the respective received signal sample, the output of the subtracter constituting said noise sample estimates for each subcarrier in each OFDM symbol; and wherein said subcarrier symbol information is the subcarrier symbol information of the one or more OFDM training symbols of the preamble part of a burst.

42. A processing device according to claim 40, wherein said noise sample estimate determining unit comprises a multiplier for multiplying the channel coefficient estimate on the respective subcarrier with the subcarrier symbol information and a subtractor for subtracting the multiplication result from the respective received signal sample, the output of the subtractor constituting said noise sample estimates for each subcarrier in each OFDM symbol; and wherein said subcarrier symbol information is a subcarrier symbol estimate information of data-bearing subcarrier symbols within the protocol data units within a burst.

43. A processing device according to claim 40, wherein said noise sample estimate determining unit comprises a multiplier for multiplying the channel coefficient estimate on the respective subcarrier with the subcarrier symbol information and a subtractor for subtracting the multiplication result from the respective received signal sample, the output of the subtractor constituting said noise sample estimates for each subcarrier in each OFDM symbol; and wherein said subcarrier symbol estimate information of data-bearing subcarrier symbols within the protocol data units within a burst is generated by a remodulation unit which is adapted for remodulating of OFDM symbol decisions output by the demodulator.

44. A processing device according to claim 40, wherein said noise sample estimate determining unit comprises a multiplier for multiplying the channel coefficient estimate on the respective subcarrier with the subcarrier symbol information and a subtractor for subtracting the multiplication result from the respective received signal sample, the output of the subtractor constituting said noise sample estimates for each subcarrier in each OFDM symbol; and wherein said subcarrier symbol estimate information of data-bearing subcarrier symbols within the protocol data units within a burst is generated by a reencoding/re-modulation unit which is adapted for re-encoding/re-modulating of the output by a decoder.

45. A transmission link property selector including a transmission link property decider for selecting transmission properties of an OFDM transmission link depending on a transmission link quality measure, wherein:

said transmission link property selector comprises a link quality determining unit in accordance with claim 3 for outputting said link quality measure, and said transmission link property decider is adapted to decide on the transmission properties of said transmission link on the basis of the link quality measure output by the link quality determination unit.

* * * * *